US007461392B2

(12) United States Patent
Herley

(10) Patent No.: US 7,461,392 B2
(45) Date of Patent: Dec. 2, 2008

(54) SYSTEM AND METHOD FOR IDENTIFYING AND SEGMENTING REPEATING MEDIA OBJECTS EMBEDDED IN A STREAM

(75) Inventor: Cormac Herley, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1551 days.

(21) Appl. No.: 10/187,774

(22) Filed: Jul. 1, 2002

(65) Prior Publication Data

US 2004/0001160 A1 Jan. 1, 2004

(51) Int. Cl.
*H04N 17/00* (2006.01)
*H04N 17/04* (2006.01)

(52) U.S. Cl. ............................ 725/19; 725/18; 725/20; 382/100

(58) Field of Classification Search ............ 725/18–20; 382/100
See application file for complete search history.

(56) References Cited

U.S. PATENT DOCUMENTS

| | | | | |
|---|---|---|---|---|
| 4,677,466 | A | 6/1987 | Lert et al. | 725/22 |
| 4,739,398 | A | 4/1988 | Thomas et al. | 725/22 |
| 5,436,653 | A | 7/1995 | Ellis et al. | 725/22 |
| 5,504,518 | A | 4/1996 | Ellis et al. | 725/22 |
| 5,748,332 | A | 5/1998 | Lee et al. | 386/68 |
| 5,996,015 | A | 11/1999 | Day et al. | 709/226 |
| 6,014,706 | A | 1/2000 | Cannon et al. | 709/231 |
| 6,332,144 | B1 | 12/2001 | deVries et al. | 707/102 |
| 6,577,346 | B1 | 6/2003 | Perlman | 348/460 |
| 6,633,651 | B1 * | 10/2003 | Hirzalla et al. | 382/100 |
| 2002/0083060 | A1 * | 6/2002 | Wang et al. | 707/10 |

(Continued)

FOREIGN PATENT DOCUMENTS

| | | |
|---|---|---|
| EP | 1 069 769 | 1/2001 |

(Continued)

OTHER PUBLICATIONS

Chih-Chin Liu and Po-Jun Tsai, "Multimedia Information Processing: Content-Based Retrieval of MP3 Music Objects," Proceedings of the Tenth International Conference on Information and Knowledge Management, Nov. 2001.

(Continued)

*Primary Examiner*—Christopher Kelley
*Assistant Examiner*—Reuben M Brown
(74) *Attorney, Agent, or Firm*—Lyon & Harr, LLP; Mark A. Watson

(57) ABSTRACT

An "object extractor" automatically identifies and segments repeating media objects in a media stream. "Objects" are any section of non-negligible duration, i.e., a song, video, advertisement, jingle, etc., which would be considered to be a logical unit by a human listener or viewer. Identification and segmentation of repeating objects is achieved by directly comparing sections of the media stream to identify matching portions of the stream, then aligning the matching portions to identify object endpoints. Alternately, a suite of object dependent algorithms is employed to target particular aspects of the stream for identifying possible objects within the stream. Confirmation of possible objects as repeating objects is achieved by automatically searching for potentially matching objects in a dynamic object database, followed by a detailed comparison to one or more of the potentially matching objects. Object endpoints are then determined by automatic alignment and comparison to other copies of that object.

91 Claims, 7 Drawing Sheets

U.S. PATENT DOCUMENTS

| | | | | |
|---|---|---|---|---|
| 2003/0086341 | A1 * | 5/2003 | Wells et al. | 369/13.56 |
| 2007/0206821 | A1 * | 9/2007 | Beard | 381/124 |

FOREIGN PATENT DOCUMENTS

| | | |
|---|---|---|
| GB | 2327167 | 1/1999 |
| WO | WO 98/20675 | 5/1998 |
| WO | WO 00/28396 | 5/2000 |
| WO | WO 01/28240 | 4/2001 |

OTHER PUBLICATIONS

Naveed U. Qazi, Miae Woo, and Arif Ghafoor, "A Synchronization and Communication Model for Distributed Multimedia Objects," Proceedings of the First ACM International Conference on Multimedia, Sep. 1993.

Xiaodong Wen, Theodore D. Huffmire, Helen H. Hu, and Adam Finkelstein, "Wavelet-Based Video Indexing and Querying for a Smart VCR," Princeton University, Dec. 1998.

Roland Tusch, Harald Kosch, and Lázló Böszörményi, "VIDEX: An Integrated Generic Video Indexing Approach," Proceedings of the Eighth ACM International Conference on Multimedia, Oct. 2000.

Rune Hjelsvold, Roger Midstraum, and Olav Sandstå, "A Temporal Foundation of Video Databases," Recent Advances in Temporal Databases, Proceedings of the International Workshop on Temporal Databases, Dec. 1995.

* cited by examiner

SYSTEM AND METHOD FOR IDENTIFYING AND SEGMENTING REPEATING MEDIA OBJECTS EMBEDDED IN A STREAM

BACKGROUND

1. Technical Field

The invention is related to media stream identification and segmentation, and in particular, to a system and method for identifying and extracting repeating audio and/or video objects from one or more streams of media such as, for example, a media stream broadcast by a radio or television station.

2. Related Art

There are many existing schemes for identifying audio and/or video objects such as particular advertisements, station jingles, or songs embedded in an audio stream, or advertisements or other videos embedded in a video stream. For example, with respect to audio identification, many such schemes are referred to as "audio fingerprinting" schemes. Typically, audio fingerprinting schemes take a known object, and reduce that object to a set of parameters, such as, for example, frequency content, energy level, etc. These parameters are then stored in a database of known objects. Sampled portions of the streaming media are then compared to the fingerprints in the database for identification purposes.

Thus, in general, such schemes typically rely on a comparison of the media stream to a large database of previously identified media objects. In operation, such schemes often sample the media stream over a desired period using some sort of sliding window arrangement, and compare the sampled data to the database in order to identify potential matches. In this manner, individual objects in the media stream can be identified. This identification information is typically used for any of a number of purposes, including segmentation of the media stream into discrete objects, or generation of play lists or the like for cataloging the media stream.

However, as noted above, such schemes require the use of a preexisting database of pre-identified media objects for operation. Without such a preexisting database, identification, and/or segmentation of the media stream are not possible when using the aforementioned conventional schemes.

Therefore, what is needed is a system and method for efficiently identifying and extracting or segmenting repeating media objects from a media stream such as a broadcast radio or television signal without the need to use a preexisting database of pre-identified media objects.

SUMMARY

An "object extractor" as described herein automatically identifies and segments repeating objects in a media stream comprised of repeating and non-repeating objects. An "object" is defined to be any section of non-negligible duration that would be considered to be a logical unit, when identified as such by a human listener or viewer. For example, a human listener can listen to a radio station, or listen to or watch a television station or other media broadcast stream and easily distinguish between non-repeating programs, and advertisements, jingles, and other frequently repeated objects. However, automatically distinguishing the same, e.g., repeating, content automatically in a media stream is generally a difficult problem.

For example, an audio stream derived from a typical pop radio station will contain, over time, many repetitions of the same objects, including, for example, songs, jingles, advertisements, and station identifiers. Similarly, an audio/video media stream derived from a typical television station will contain, over time, many repetitions of the same objects, including, for example, commercials, advertisements, station identifiers, program "signature tunes", or emergency broadcast signals. However, these objects will typically occur at unpredictable times within the media stream, and are frequently corrupted by noise caused by any acquisition process used to capture or record the media stream.

Further, objects in a typical media stream, such as a radio broadcast, are often corrupted by voice-overs at the beginning and/or end point of each object. Further, such objects are frequently foreshortened, i.e., they are not played completely from the beginning or all the way to the end. Additionally, such objects are often intentionally distorted. For example, audio broadcast via a radio station is often processed using compressors, equalizers, or any of a number of other time/frequency effects. Further, audio objects, such as music or a song, broadcast on a typical radio station are often cross-faded with the preceding and following music or songs, thereby obscuring the audio object start and end points, and adding distortion or noise to the object. Such manipulation of the media stream is well known to those skilled in the art. Finally, it should be noted that any or all of such corruptions or distortions can occur either individually or in combination, and are generally referred to as "noise" in this description, except where they are explicitly referred to individually. Consequently, identification of such objects and locating the endpoints for such objects in such a noisy environment is a challenging problem.

The object extractor described herein successfully addresses these and other issues while providing many advantages. For example, in addition to providing a useful technique for gathering statistical information regarding media objects within a media stream, automatic identification and segmentation of the media stream allows a user to automatically access desired content within the stream, or, conversely, to automatically bypass unwanted content in the media stream. Further advantages include the ability to identify and store only desirable content from a media stream; the ability to identify targeted content for special processing; the ability to de-noise, or clear up any multiply detected objects, and the ability to archive the stream more efficiently by storing only a single copy of multiply detected objects.

As noted above, a system and method for automatically identifying and segmenting repeating media objects in a media stream identifies such objects by examining the stream to determine whether previously encountered objects have occurred. For example, in the audio case this would mean identifying songs as being objects that have appeared in the stream before. Similarly in the case of video derived from a television stream it can involve identifying specific advertisements, as well as station "jingles" and other frequently repeated objects. Further, such objects often convey important synchronization information about the stream. For example the theme music of a news station conveys time and the fact that the news report is about to begin or has just ended.

For example, given an audio stream which contains objects that repeat and objects that do not repeat, the system and method described herein automatically identifies and segments repeating media objects in the media stream, while identifying object endpoints by a comparison of matching portions of the media stream or matching repeating objects. Using broadcast audio, i.e. radio, as an example, "objects" that repeat may include, for example, songs on a radio music station, call signals, jingles, and advertisements.

Examples of objects that do not repeat may include, for example, live chat from disk jockeys, news and traffic bulletins, and programs or songs that are played only once. These different types of objects have different characteristics that for allow identification and segmentation from the media stream. For example radio advertisements on a popular radio station are generally less than 30 seconds in length, and consist of a jingle accompanied by voice. Station jingles are generally 2 to 10 seconds in length and are mostly music and voice and repeat very often throughout the day. Songs on a "popular" music station, as opposed to classical, jazz or alternative, for example, are generally 2 to 7 minutes in length and most often contain voice as well as music.

In general, automatic identification and segmentation of repeating media objects is achieved by comparing portions of the media stream to locate regions or portions within the media stream where media content is being repeated. In a tested embodiment, identification and segmentation of repeating objects is achieved by directly comparing sections of the media stream to identify matching portions of the stream, then aligning the matching portions to identify object endpoints. In a related embodiment segments are first tested to estimate whether there is a probability that an object of the type being sought is present in the segment. If so, comparison with other segments of the media stream proceeds; but if not further processing of the segment in question can be neglected in the interests of improving efficiency.

In another embodiment, automatic identification and segmentation of repeating media objects is achieved by employing a suite of object dependent algorithms to target different aspects of audio and/or video media for identifying possible objects. Once a possible object is identified within the stream, confirmation of an object as a repeating object is achieved by an automatic search for potentially matching objects in an automatically instantiated dynamic object database, followed by a detailed comparison between the possible object and one or more of the potentially matching objects. Object endpoints are then automatically determined by automatic alignment and comparison to other repeating copies of that object.

Specifically, identifying repeat instances of an object includes first instantiating or initializing an empty "object database" for storing information such as, for example, pointers to media object positions within the media stream, parametric information for characterizing those media objects, metadata for describing such objects, object endpoint information, or copies of the objects themselves. Note that any or all of this information can be maintained in either a single object database, or in any number of databases or computer files. The next step involves capturing and storing at least one media stream over a desired period of time. The desired period of time can be anywhere from minutes to hours, or from days to weeks or longer. However, the basic requirement is that the sample period should be long enough for objects to begin repeating within the stream. Repetition of objects allows the endpoints of the objects to be identified when the objects are located within the stream.

As noted above, in one embodiment, automatic identification and segmentation of repeating media objects is achieved by comparing portions of the media stream to locate regions or portions within the media stream where media content is being repeated. Specifically, in this embodiment, a portion or window of the media stream is selected from the media stream. The length of the window can be any desired length, but typically should not be so short as to provide little or no useful information, or so long that it potentially encompasses too many media objects. In a tested embodiment, windows or segments on the order of about two to five times the length of the average object of the sought class or so was found to produce good results. This portion or window can be selected from either end of the media stream, or can even be randomly selected from the media stream.

Next, the selected portion of the media stream is directly compared against similar sized portions of the media stream in an attempt to locate a matching section of the media stream. These comparisons continue until either the entire media stream has been searched to locate a match, or until a match is actually located, whichever comes first. As with the selection of the portion for comparison to the media stream, the portions which are compared to the selected segment or window can be taken sequentially beginning at either end of the media stream, or can even be randomly taken from the media stream.

In this tested embodiment, once a match is identified by the direct comparison of portions of the media stream, identification and segmentation of repeating objects is then achieved by aligning the matching portions to locate object endpoints. Note that because each object includes noise, and may be shortened or cropped, either at the beginning or the end, as noted above, the object endpoints are not always clearly demarcated. However, even in such a noisy environment, approximate endpoints are located by aligning the matching portions using any of a number of conventional techniques, such as simple pattern matching, aligning cross-correlation peaks between the matching portions, or any other conventional technique for aligning matching signals. Once aligned, the endpoints are identified by tracing backwards and forwards in the media stream, past the boundaries of the matching portions, to locate those points where the two portions of the media stream diverge. Because repeating media objects are not typically played in exactly the same order every time they are broadcast, this technique for locating endpoints in the media stream has been observed to satisfactorily locate the start and endpoints of media objects in the media stream.

Alternately, as noted above, in one embodiment, a suite of algorithms is used to target different aspects of audio and/or video media for computing parametric information useful for identifying objects in the media stream. This parametric information includes parameters that are useful for identifying particular objects, and thus, the type of parametric information computed is dependent upon the class of object being sought. Note that any of a number of well-known conventional frequency, time, image, or energy-based techniques for comparing the similarity of media objects can be used to identify potential object matches, depending upon the type of media stream being analyzed. For example, with respect to music or songs in an audio stream, these algorithms include, for example, calculating easily computed parameters in the media stream such as beats per minute in a short window, stereo information, energy ratio per channel over short intervals, and frequency content of particular frequency bands; comparing larger segments of media for substantial similarities in their spectrum; storing samples of possible candidate objects; and learning to identify any repeated objects In this embodiment, once the media stream has been acquired, the stored media stream is examined to determine a probability that an object of a sought class, i.e., song, jingle, video, advertisement, etc., is present at a portion of the stream being examined. Once the probability that a sought object exists reaches a predetermined threshold, the position of that probable object within the stream is automatically noted within the aforementioned database. Note that this detection or similarity threshold can be increased or decreased as desired in order to adjust the sensitivity of object detection within the stream.

Given this embodiment, once a probable object has been identified in the stream, parametric information for characterizing the probable object is computed and used in a database query or search to identify potential object matches with previously identified probable objects. The purpose of the database query is simply to determine whether two portions of a stream are approximately the same. In other words, whether the objects located at two different time positions within the stream are approximately the same. Further, because the database is initially empty, the likelihood of identifying potential matches naturally increases over time as more potential objects are identified and added to the database.

Once the potential matches to the probable object have been returned, a more detailed comparison between the probable object and one or more of the potential matches is performed in order to more positively identify the probable object. At this point, if the probable object is found to be a repeat of one of the potential matches, it is identified as a repeat object, and its position within the stream is saved to the database. Conversely, if the detailed comparison shows that the probable object is not a repeat of one of the potential matches, it is identified as a new object in the database, and its position within the stream and parametric information is saved to the database as noted above.

Further, as with the previously discussed embodiment, the endpoints of the various instances of a repeating object are automatically determined. For example if there are N instances of a particular object, not all of them may be of precisely the same length. Consequently, a determination of the endpoints involves aligning the various instances relative to one instance and then tracing backwards and forwards in each of the aligned objects to determine the furthest extent at which each of the instances is still approximately equal to the other instances.

It should be noted that the methods for determining the probability that an object of a sought class is present at a portion of the stream being examined, and for testing whether two portions of the stream are approximately the same both depend heavily on the type of object being sought (e.g., music, speech, advertisements, jingles, station identifications, videos, etc.) while the database and the determination of endpoint locations within the stream are very similar regardless of what kind of object is being sought.

In still further modifications of each of the aforementioned embodiments, the speed of media object identification in a media stream is dramatically increased by restricting searches of previously identified portions of the media stream, or by first querying a database of previously identified media objects prior to searching the media stream.

Further, in a related embodiment, the media stream is analyzed by first analyzing a portion of the stream large enough to contain repetition of at least the most common repeating objects in the stream. A database of the objects that repeat on this first portion of the stream is maintained. The remainder portion of the stream is then analyzed by first determining if segments match any object in the database, and then subsequently checking against the rest of the stream.

In addition to the just described benefits, other advantages of the system and method for automatically identifying and segmenting repeating media objects in a media stream will become apparent from the detailed description which follows hereinafter when taken in conjunction with the accompanying drawing figures.

DESCRIPTION OF THE DRAWINGS

The specific features, aspects, and advantages of the media object extractor will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings, which form a part hereof, and in which is shown by way of illustration specific embodiments in which the invention may be practiced. It is understood that other embodiments may be utilized and structural changes may be made without departing from the scope of the present invention.

Figure 1:
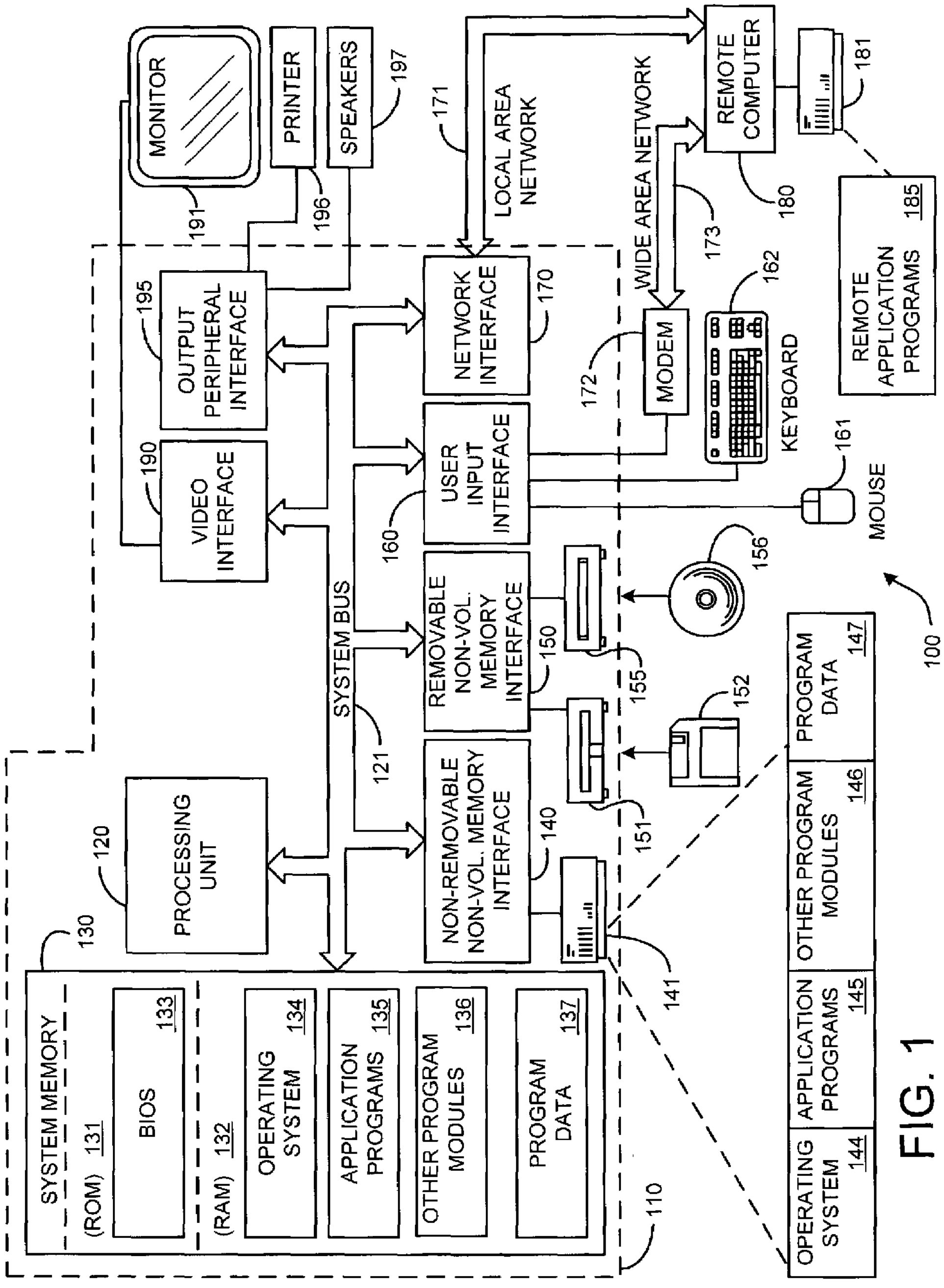
FIG. 1 is a general system diagram depicting a general-purpose computing device constituting an exemplary system for automatically identifying and segmenting repeating media objects in a media stream.

1.0 Exemplary Operating Environment:

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a-communications network. In a distributed computing environment, program modules may be located in both local and remote computer storage media including memory storage devices. With reference to FIG. 1, an exemplary system for implementing the invention includes a general-purpose computing device in the form of a computer 110.

Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad.

Other input devices (not shown) may include a microphone, joystick, game pad, satellite dish, scanner, radio receiver, or a television or broadcast video receiver, or the like. These and other input devices are often connected to the processing unit 120 through a user input interface 160 that is coupled to the system bus 121, but may be connected by other interface and bus structures, such as, for example, a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining part of this description will be devoted to a discussion of the program modules and processes embodying a system and method for automatically identifying and segmenting repeating media objects in a media stream.

2.0 Introduction:

An "object extractor" as described herein automatically identifies and segments repeating objects in a media stream comprised of repeating and non-repeating objects. An "object" is defined to be any section of non-negligible duration that would be considered to be a logical unit, when identified as such by a human listener or viewer. For example, a human listener can listen to a radio station, or listen to or watch a television station or other media broadcast stream and easily distinguish between non-repeating programs, and advertisements, jingles, or other frequently repeated objects. However, automatically distinguishing the same, e.g., repeating, content automatically in a media stream is generally a difficult problem.

For example, an audio stream derived from a typical pop radio station will contain, over time, many repetitions of the same objects, including, for example, songs, jingles, advertisements, and station identifiers. Similarly, an audio/video media stream derived from a typical television station will contain, over time, many repetitions of the same objects, including, for example, commercials, advertisements, station identifiers, or emergency broadcast signals. However, these objects will typically occur at unpredictable times within the media stream, and are frequently corrupted by noise caused by any acquisition process used to capture or record the media stream.

Further, objects in a typical media stream, such as a radio broadcast, are often corrupted by voice-overs at the beginning and/or end point of each object. Further, such objects are frequently foreshortened, i.e., they are not played completely from the beginning or all the way to the end. Additionally, such objects are often intentionally distorted. For example, audio broadcast via a radio station is often processed using compressors, equalizers, or any of a number of other time/frequency effects. Further, audio objects, such as music or a song, broadcast on a typical radio station is often cross-faded with the preceding and following music or songs, thereby obscuring the audio object start and end points, and adding distortion or noise to the object. Such manipulation of the media stream is well known to those skilled in the art. Finally, it should be noted that any or all of such corruptions or distortions can occur either individually or in combination, and are generally referred to as "noise" in this description, except where they are explicitly referred to individually. Consequently, identification of such objects and locating the endpoints for such objects in such a noisy environment is a challenging problem.

The object extractor described herein successfully addresses these and other issues while providing many advantages. For example, in addition to providing a useful technique for gathering statistical information regarding media objects within a media stream, automatic identification and segmentation of the media stream allows a user to automatically access desired content within the stream, or, conversely, to automatically bypass unwanted content in the media stream. Further advantages include the ability to identify and store only desirable content from a media stream; the ability to identify targeted content for special processing, the ability to de-noise, or clear up any multiply detected objects; and the ability to archive the stream efficiently by storing only single copies of any multiply detected objects.

In general, automatic identification and segmentation of repeating media objects is achieved by comparing portions of the media stream to locate regions or portions within the media stream where media content is being repeated. In a tested embodiment, identification and segmentation of repeating objects is achieved by directly comparing sections of the media stream to identify matching portions of the stream, then aligning the matching portions to identify object endpoints.

In another embodiment, automatic identification and segmentation of repeating media objects is achieved by employing a suite of object dependent algorithms to target different aspects of audio and/or video media for identifying possible objects. Once a possible object is identified within the stream, confirmation of an object as a repeating object is achieved by an automatic search for potentially matching objects in an automatically instantiated dynamic object database, followed by a detailed comparison between the possible object and one or more of the potentially matching objects. Object endpoints are then automatically determined by automatic alignment and comparison to other repeating copies of that object.

Various alternate embodiments, as described below are used to dramatically increase the speed of media object identification in a media stream by restricting searches of previously identified portions of the media stream, or by first querying a database of previously identified media objects prior to searching the media stream. Further, in a related embodiment, the media stream is analyzed in segments corresponding to a period of time sufficient to allow for one or more repeat instances of media objects, followed by a database query then a search of the media stream, if necessary.

2.1 System Overview:

In general, identifying repeat instances of an object includes first instantiating or initializing an empty "object database" for storing information such as, for example, pointers to media object positions within the media stream, parametric information for characterizing those media objects, metadata for describing such objects, object endpoint information, or copies of the objects themselves. Note that any or all of this information can be maintained in either a single object database, or in any number of databases or computer files. However, for clarity of discussion, a single database will be referred to throughout this discussion as the aforementioned information. Note that in an alternate embodiment, a preexisting database including parametric information for characterizing pre-identified objects is used in place of the empty database. However, while such a preexisting database can speed up initial object identifications, over time, it does not provide significantly better performance over an initially empty database that is populated with parametric information as objects are located within the stream.

In either case, once the object database, either empty, or preexisting, is available, the next step involves capturing and storing at least one media stream over a desired period of time. The desired period of time can be anywhere from minutes to hours, or from days to weeks or longer. However, the basic requirement is that the sample period should be long enough for objects to begin repeating within the stream. Repetition of objects allows the endpoints of the objects to be identified when the objects are located within the stream. As discussed herein, repetition of objects allows the endpoints of the objects to be identified when the objects are located within the stream. In another embodiment, in order to minimize storage requirements, the stored media stream is compressed using any desired conventional compression method for compressing audio/and or video content. Such compression techniques are well known to those skilled in the art, and will not be discussed herein.

As noted above, in one embodiment, automatic identification and segmentation of repeating media objects is achieved by comparing portions of the media stream to locate regions or portions within the media stream where media content is being repeated. Specifically, in this embodiment, a portion or window of the media stream is selected from the media stream. The length of the window can be any desired length, but typically should not be so short as to provide little or no useful information, or so long that it potentially encompasses multiple media objects. In a tested embodiment, windows or segments on the order of about two to five times the length of the average repeated object of the sought type was found to produce good results. This portion or window can be selected beginning from either end of the media stream, or can even be randomly selected from the media stream.

Next, the selected portion of the media stream is directly compared against similar sized portions of the media stream in an attempt to locate a matching section of the media stream. These comparisons continue until either the entire media stream has been searched to locate a match, or until a match is actually located, whichever comes first. As with the selection of the portion for comparison to the media stream, the portions which are compared to the selected segment or window can be taken sequentially beginning at either end of the media stream, or can even be randomly taken from the media stream, or when an algorithm indicates the probability that an object of the sought class is present in the current segment.

In this tested embodiment, once a match is identified by the direct comparison of portions of the media stream, identification and segmentation of repeating objects is then achieved by aligning the matching portions to locate object endpoints. Note that because each object includes noise, and may be shortened or cropped, either at the beginning or the end, as noted above, the object endpoints are not always clearly demarcated. However, even in such a noisy environment, approximate endpoints are located by aligning the matching portions using any of a number of conventional techniques, such as simple pattern matching, aligning cross-correlation peaks between the matching portions, or any other conventional technique for aligning matching signals. Once aligned, the endpoints are identified by tracing backwards and forwards in the media stream, past the boundaries of the matching portions, to locate those points where the two portions of the media stream diverge. Because repeating media objects are not typically played in exactly the same order every time they are broadcast, this technique for locating endpoints in the media stream has been observed to satisfactorily locate the start and endpoints of media objects in the media stream.

Alternately, as noted above, in one embodiment, a suite of algorithms is used to target different aspects of audio and/or video media for computing parametric information useful for identifying objects in the media stream. This parametric information includes parameters that are useful for identifying particular objects, and thus, the type of parametric information computed is dependent upon the class of object being sought. Note that any of a number of well-known conventional frequency, time, image, or energy-based techniques for comparing the similarity of media objects can be used to identify potential object matches, depending upon the type of media stream being analyzed. For example, with respect to music or songs in an audio stream, these algorithms include, for example, calculating easily computed parameters in the media stream such as beats per minute in a short window, stereo information, energy ratio per channel over short intervals, and frequency content of particular frequency bands; comparing larger segments of media for substantial similarities in their spectrum; storing samples of possible candidate objects; and learning to identify any repeated objects In this embodiment, once the media stream has been acquired, the stored media stream is examined to determine a probability that an object of a sought class, i.e., song, jingle, video, advertisement, etc., is present at a portion of the stream being examined. However, it should be noted that in an alternate embodiment, the media stream is examined in real-time, as it is stored, to determine the probability of the existence of a sought object at the present time within the stream. Note that real-time or post storage media stream examination is handled in substantially the same manner. Once the probability that a sought object exists reaches a predetermined threshold, the position of that probable object within the stream is automatically noted within the aforementioned database. Note that this detection or similarity threshold can be increased or decreased as desired in order to adjust the sensitivity of object detection within the stream.

Given this embodiment, once a probable object has been identified in the stream, parametric information for characterizing the probable object is computed and used in a database query or search to identify potential object matches with previously identified probable objects. The purpose of the database query is simply to determine whether two portions of a stream are approximately the same. In other words, whether the objects located at two different time positions within the stream are approximately the same. Further, because the database is initially empty, the likelihood of identifying potential matches naturally increases over time as more potential objects are identified and added to the database.

Note that in alternate embodiments, the number of potential matches returned by the database query is limited to a desired maximum in order to reduce system overhead. Further, as noted above, the similarity threshold for comparison of the probable object with objects in the database is adjustable in order to either increase or decrease the likelihood of a potential match as desired. In yet another related embodiment, those objects found to repeat more frequently within a media stream are weighted more heavily so that they are more likely to be identified as a potential match than those objects that repeat less frequently. In still another embodiment, if too many potential matches are returned by the database search, then the similarity threshold is increased so that fewer potential matches are returned.

Once the potential matches to the probable object have been returned, a more detailed comparison between the probable object and one or more of the potential matches is performed in order to more positively identify the probable object. At this point, if the probable object is found to be a repeat of one of the potential matches, it is identified as a repeat object, and its position within the stream is saved to the database. Conversely, if the detailed comparison shows that the probable object is not a repeat of one of the potential matches, it is identified as a new object in the database, and its position within the stream and parametric information is saved to the database as noted above. However, in an alternate embodiment, if the object is not identified as a repeat object, a new database search is made using a lower similarity threshold to identify additional objects for comparison. Again, if the probable object is determined to be a repeat it is identified as such, otherwise, it is added to the database as a new object as described above.

Further, as with the previously discussed embodiment, the endpoints of the various instances of a repeating object are automatically determined. For example if there are N instances of a particular object, not all of them may be of precisely the same length. Consequently, a determination of the endpoints involves aligning the various instances relative to one instance and then tracing backwards and forwards in each of the aligned objects to determine the furthest extent at which each of the instances is still approximately equal to the other instances.

It should be noted that the methods for determining the probability that an object of a sought class is present at a portion of the stream being examined, and for testing whether two portions of the stream are approximately the same both depend heavily on the type of object being sought (e.g., music, speech, advertisements, jingles, station identifications, videos, etc.) while the database and the determination of endpoint locations within the stream are very similar regardless of what kind of object is being sought.

In still further modifications of each of the aforementioned embodiments, the speed of media object identification in a media stream is dramatically increased by restricting searches of previously identified portions of the media stream, or by first querying a database of previously identified media objects prior to searching the media stream. Further, in a related embodiment, the media stream is analyzed in segments corresponding to a period of time sufficient to allow for one or more repeat instances of media objects, followed by a database query then a search of the media stream, if necessary.

Finally, in another embodiment, once the endpoints have been determined as noted above, objects are extracted from the audio stream and stored in individual files. Alternately, pointers to the object endpoints within the media stream are stored in the database.

Figure 2:
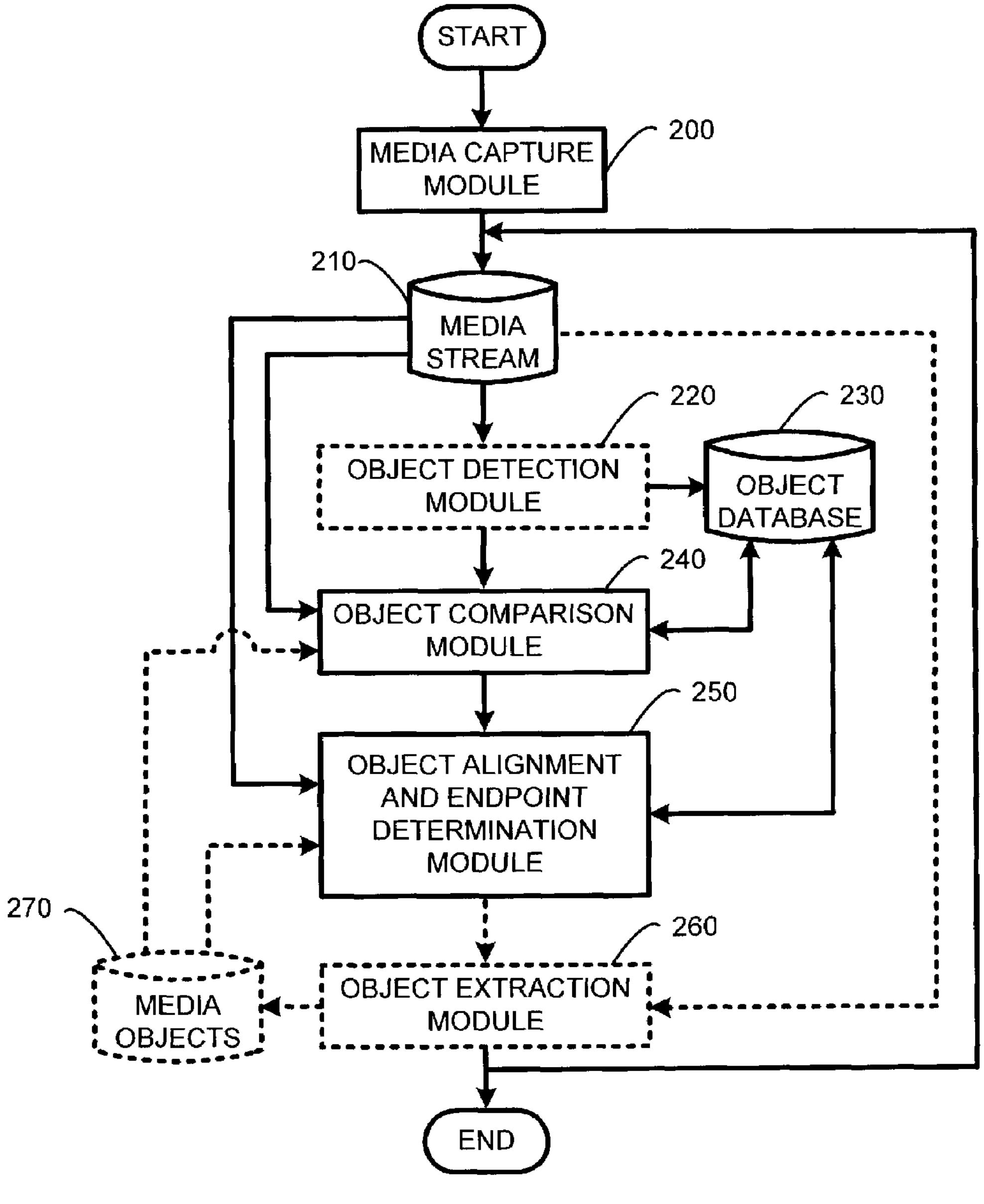
FIG. 2 illustrates an exemplary architectural diagram showing exemplary program modules for automatically identifying and segmenting repeating media objects in a media stream.

2.2 System Architecture:

The general system diagram of FIG. 2 illustrates the process summarized above. In particular, the system diagram of FIG. 2 illustrates the interrelationships between program modules for implementing an "object extractor" for automatically identifying and segmenting repeating objects in a media stream. It should be noted that the boxes and interconnections between boxes that are represented by broken or dashed lines in FIG. 2 represent alternate embodiments of the invention, and that any or all of these alternate embodiments, as described below, may be used in combination with other alternate embodiments that are described throughout this document.

In particular, as illustrated by FIG. 2, a system and method for automatically identifying and segmenting repeating objects in a media stream begins by using a media capture module 200 for capturing a media stream containing audio and/or video information. The media capture module 200 uses any of a number conventional techniques to capture a radio or television/video broadcast media stream. Such media capture techniques are well known to those skilled in the art, and will not be described herein. Once captured, the media stream 210 is stored in a computer file or database. Further, in one embodiment, the media stream 210 is compressed using conventional techniques for compression of audio and/or video media.

In one embodiment, an object detection module 220 selects a segment or window from the media stream and provides it to an object comparison module 240 performing a direct comparison between that section and other sections or windows of the media stream 210 in an attempt to locate matching portions of the media stream. As noted above, the comparisons performed by the object comparison module 240 continue until either the entire media stream 210 has been searched to locate a match, or until a match is actually located, whichever comes first.

In this embodiment, once a match is identified by the direct comparison of portions of the media stream by the object comparison module 240, identification and segmentation of repeating objects is then achieved using an object alignment and endpoint determination module 250 to align the matching portions of the media stream and then search backwards and forwards from the center of alignment between the portions of the media stream to identify the furthest extents at which each object is approximately equal. Identifying the extents of each object in this manner serves to identify the object endpoints. In one embodiment, this endpoint information is then stored in the object database 230.

Alternately, in another embodiment, rather than simply selecting a window or segment of the media stream for comparison purposes, the object detection module first examines the media stream 210 in an attempt to identify potential media objects embedded within the media stream. This examination of the media stream 210 is accomplished by examining a window representing a portion of the media stream. As noted above, the examination of the media stream 210 to detect possible objects uses one or more detection algorithms that are tailored to the type of media content being examined. In general, these detection algorithms compute parametric information for characterizing the portion of the media stream being analyzed. Detection of possible media objects is described below in further detail in Section 3.1.1.

Once the object detection module 220 identifies a possible object, the location or position of the possible object within the media stream 210 is noted in an object database 230. In addition, the parametric information for characterizing the possible object computed by object detection module 220 is also stored in the object database 230. Note that this object database is initially empty, and that the first entry in the object database 230 corresponds to the first possible object that is detected by the object detection module 220. Alternately, the object database is pre-populated with results from the analysis or search of a previously captured media stream. The object database is described in further detail below in Section 3.1.3.

Following the detection of a possible object within the media stream 210, an object comparison module 240 then queries the object database 230 to locate potential matches, i.e., repeat instances, for the possible object. Once one or more potential matches have been identified, the object comparison module 240 then performs a detailed comparison between the possible object and one or more of the potentially matching objects. This detailed comparison includes either a direct comparison of portions of the media stream representing the possible object and the potential matches, or a comparison between a lower-dimensional version of the portions of the media stream representing the possible object and the potential matches. This comparison process is described in further detail below in Section 3.1.2.

Next, once the object comparison module 240 has identified a match or a repeat instance of the possible object, the possible object is flagged as a repeating object in the object database 230. An object alignment and endpoint determination module 250 then aligns the newly identified repeat object with each previously identified repeat instance of the object, and searches backwards and forwards among each of these objects to identify the furthest extents at which each object is approximately equal. Identifying the extents of each object in this manner serves to identify the object endpoints. This endpoint information is then stored in the object database 230. Alignment and identification of object endpoints is discussed in further detail below in Section 3.1.4.

Finally, in another embodiment, once the object endpoints have been identified by the object alignment and endpoint determination module 250, an object extraction module 260 uses the endpoint information to copy the section of the media stream corresponding to those endpoints to a separate file or database of individual media objects 270. Note also that in another embodiment, the media objects 270 are used in place of portions of the media stream representing potential matches to the possible objects for the aforementioned comparison between lower-dimensional versions of the possible object and the potential matches.

The processes described above are repeated, with the portion of the media stream 210 that is being analyzed by the object detection module 220 being incremented, such as, for example, by using a sliding window, or by moving the beginning of the window to the computed endpoint of the last detected media object. These processes continue until such time as the entire media stream has been examined, or until a user terminates the examination. In the case of searching a stream in real-time for repeating objects, the search process may be terminated when a pre-determined amount of time has been expended.

3.0 Operation Overview:

The above-described program modules are employed in an “object extractor” for automatically identifying and segmenting repeating objects in a media stream. This process is depicted in the flow diagrams of FIG. 3A through FIG. 5, which represent alternate embodiments of the object extractor, following a detailed operational discussion of exemplary methods for implementing the aforementioned program modules.

3.1 Operational Elements:

As noted above, an object extractor operates to automatically identify and segment repeating objects in a media stream. A working example of a general method of identifying repeat instances of an object generally includes the following elements:

1. A technique for determining whether two portions of the media stream are approximately the same. In other words, a technique for determining whether media objects located at approximately time position $t_i$ and $t_j$, respectively, within the media stream are approximately the same. See Section 3.1.2 for further details. Note that in a related embodiment, the technique for determining whether two portions of the media stream are approximately the same is preceded by a technique for determining the probability that a media object of a sought class is present at the portion of the media stream being examined. See Section 3.1.1 for further details.
2. An object database for storing information for describing each located instance of particular repeat objects. The object database contains records, such as, for example, pointers to media object positions within the media stream, parametric information for characterizing those media objects, metadata for describing such objects, object endpoint information, or copies of the objects themselves. Again, as noted above, the object database can actually be one or more databases as desired. See Section 3.1.3 for further details.
3. A technique for determining the endpoints of the various instances of any identified repeat objects. In general, this technique first aligns each matching segment or media object and then traces backwards and forwards in time to determine the furthest extent at which each of the instances is still approximately equal to the other instances. These furthest extents generally correspond to the endpoints of the repeating media objects. See Section 3.1.4 for further details.

It should be noted that the technique for determining the probability that a media object of a sought class is present at a portion of the stream being examined, and the technique for determining whether two portions of the media stream are approximately the same, both depend heavily on the type of object being sought (e.g., whether it is music, speech, video, etc.) while the object database and technique for determining the endpoints of the various instances of any identified repeat objects can be quite similar regardless of the type or class of object being sought.

Note that the following discussion makes reference to the detection of music or songs in an audio media stream in order to put the object extractor in context. However, as discussed above, the same generic approach applies described herein applies equally well to other classes of objects such as, for example, speech, videos, image sequences, station jingles, advertisements, etc.

3.1.1 Object Detection Probability:

As noted above, in one embodiment the technique for determining whether two portions of the media stream are approximately the same is preceded by a technique for determining the probability that a media object of a sought class is present at the portion of the media stream being examined. This determination is not necessary in the embodiment where direct comparisons are made between sections of the media stream (see Section 3.1.2); however it can greatly increase the efficiency of the search. That is, sections that are determined unlikely to contain objects of the sought class need not be compared to other sections. Determining the probability that a media object of a sought class is present in a media stream begins by first capturing and examining the media stream. For example, one approach is to continuously calculate a vector of easily computed parameters, i.e., parametric information, while advancing through the target media stream. As noted above, the parametric information needed to characterize particular media object types or classes is completely dependent upon the particular object type or class for which a search is being performed.

It should be noted that the technique for determining the probability that a media object of a sought class is present in a media stream is typically unreliable. In other words, this technique classifies many sections as probable or possible sought objects when they are not, thereby generating useless entries in the object database. Similarly, being inherently unreliable, this technique also fails to classify many actual sought objects as probable or possible objects. However, while more efficient comparison techniques can be used, the combination of the initial probable or possible detection with a later detailed comparison of potential matches for identifying repeat objects serves to rapidly identify locations of most of the sought objects in the stream.

Clearly, virtually any type of parametric information can be used to locate possible objects within the media stream. For example, with respect to commercials or other video or audio segments which repeat frequently in a broadcast video or television stream, possible or probable objects can be located by examining either the audio portion of the stream, the video portion of the stream, or both. In addition, known information about the characteristics of such objects can be used to tailor the initial detection algorithm. For example, television commercials tend to be from 15 to 45 seconds in length, and tend to be grouped in blocks of 3 to 5 minutes. This information can be used in locating commercial or advertising blocks within a video or television stream.

With respect to an audio media stream, for example, where it is desired to search for songs, music, or repeating speech, the parametric information used to locate possible objects within the media stream consists of information such as, for example, beats per minute (BPM) of the media stream calculated over a short window, relative stereo information (e.g. ratio of energy of difference channel to energy of sum channel), and energy occupancy of certain frequency bands averaged over short intervals.

In addition, particular attention is given to the continuity of certain parametric information. For example if the BPM of an audio media stream remains approximately the same over an interval of 30-seconds or longer this can be taken as an indication that a song object probably exists at that location in the stream. A constant BPM for a lesser duration provides a lower probability of object existence at a particular location within the stream. Similarly, the presence of substantial stereo information over an extended period can indicate the likelihood that a song is playing.

There are various ways of computing an approximate BPM. For example, in a working example of the object extractor, the audio stream is filtered and down-sampled to produce a lower dimension version of the original stream. In a tested embodiment, filtering the audio stream to produce a stream that contains only information in the range of 0-220 Hz was found to produce good BPM results. However, it should be appreciated that any frequency range can be examined depending upon what information is to be extracted from the media stream. Once the stream has been filtered and down-sampled, a search is then performed for dominant peaks in the low rate stream using autocorrelation of windows of approximately 10-seconds at a time, with the largest two peaks, BPM1 and BPM2, being retained. Using this technique in the tested embodiment, a determination is made that a sought object (in this case a song) exists if either BPM1 or BPM2 is approximately continuous for one minute or more. Spurious BPM numbers are eliminated using median filtering.

It should be noted that in the preceding discussion, the identification of probable or possible sought objects was accomplished using only a vector of features or parametric information. However, in a further embodiment, information about found objects is used to modify this basic search. For example, going back to the audio stream example, a gap of 4 minutes between a found object and a station jingle would be a very good candidate to add to the database as a probably sought object even if the initial search didn't flag it as such.

3.1.2 Testing Object Similarity:

As discussed above, a determination of whether two portions of the media stream are approximately the same involves a comparison of two or more portions of the media stream, located at two positions within the media stream, i.e., $t_i$ and $t_j$, respectively. Note that in a tested embodiment, the size of the windows or segments to be compared are chosen to be larger than expected media objects within the media stream. Consequently, it is to be expected that only portions of the compared sections of the media stream will actually match, rather than entire segments or windows unless media objects are consistently played in the same order within the media stream.

In one embodiment, this comparison simply involves directly comparing different portions of the media stream to identify any matches in the media stream. Note that due to the presence of noise from any of the aforementioned sources in the media stream it is unlikely that any two repeating or duplicate sections of the media stream will exactly match. However, conventional techniques for comparison of noisy signals for determining whether such signals are duplicates or repeat instances are well known to those skilled in the art, and will not be described in further detail herein. Further, such direct comparisons are applicable to any signal type without the need to first compute parametric information for characterizing the signal or media stream.

In another embodiment, as noted above, this comparison involves first comparing parametric information for portions of the media stream to identify possible or potential matches to a current segment or window of the media stream.

Whether directly comparing portions of the media stream or comparing parametric information, the determination of whether two portions of the media stream are approximately the same is inherently more reliable than the basic detection of possible objects alone (see Section 3.1.1). In other words, this determination has a relatively smaller probability of incorrectly classifying two dissimilar stretches of a media stream as being the same. Consequently, where two instances of records in the database are determined to be similar, or two segments or windows of the media stream are determined to be sufficiently similar, this is taken as confirmation that these records or portions of the media stream indeed represent a repeating object.

This is significant because in the embodiments wherein the media stream is first examined to locate possible objects, the simple detection of a possible object can be unreliable; i.e., entries are made in the database that are regarded as objects, but in fact are not. Thus in examining the contents of the database, those records for which only one copy has been found are only probably sought objects or possible objects (i.e., songs, jingles, advertisements, videos, commercials, etc.), but those for which two or more copies have been found are considered to be sought objects with a higher degree of certainty. Thus the finding of a second copy, and subsequent copies, of an object helps greatly in removing the uncertainty due to the unreliability of simply detecting a possible or probable object within the media stream.

For example, in a tested embodiment using an audio media stream, when comparing parametric information rather than performing direct comparisons, two locations in the audio stream are compared by comparing one or more of their Bark bands. To test the conjecture that locations $t_i$ and $t_j$ are approximately the same, the Bark spectra is calculated for an interval of two to five times the length of the average object of the sought class centered at each of the locations. This time is chosen simply as a matter of convenience. Next, the cross-correlation of one or more of the bands is calculated, and a search for a peak performed. If the peak is sufficiently strong to indicate that these Bark spectra are substantially the same, it is inferred that the sections of audio from which they were derived are also substantially the same.

Further, in another tested embodiment, performing this cross-correlation test with several Bark spectra bands rather than a single one increases the robustness of the comparison. Specifically, a multi-band cross-correlation comparison allows the object extractor to almost always correctly identify when two locations $t_i$ and $t_j$ represent approximately the same object, while very rarely incorrectly indicating that they are the same. Testing of audio data captured from a broadcast audio stream has shown that the Bark spectra bands that contain signal information in the 700 Hz to 1200 Hz range are particularly robust and reliable for this purpose. However, it should be noted that cross-correlation over other frequency bands can also be successfully used by the object extractor when examining an audio media stream.

Once it has been determined that locations $t_i$ and $t_j$ represent the same object, the difference between the peak positions of the cross-correlations of the Bark spectra bands, and the auto-correlation of one of the bands allows a calculation of the alignment of the separate objects. Thus, an adjusted location $t_j'$ is calculated which corresponds to the same location in a song as does $t_i$. In other words, the comparison and alignment calculations show both that the audio centered at $t_i$ and $t_j$ represent the same object, but that $t_i$ and $t_j'$ represent approximately the same position in that object. That is, for example if $t_i$ was 2 minutes into a 6 minute object, and $t_j$ was 4 minutes into the same object the comparison and alignment of the objects allows a determination of whether the objects are the same object, as well as returning $t_j'$ which represents a location that is 2 minutes into the second instance of the object.

The direct comparison case is similar. For example in the direct comparison case, conventional comparison techniques, such as, for example, performing a cross-correlation between different portions of the media stream is used to identify matching areas of the media stream. As with the previous example, the general idea is simply to determine whether two portions of the media stream at locations $t_i$ and $t_j$, respectively, are approximately the same. In Further, the direct comparison case is actually much easier to implement than the previous embodiment, because the direct comparison is not media dependent. For example, as noted above, the parametric information needed for analysis of particular signal or media types is dependent upon the type of signal or media object being characterized. However, with the direct comparison method, these media-dependent characterizations need not be determined for comparison purposes.

3.1.3 Object Database:

As noted above, in alternate embodiments, the object database is used to store information such as, for example, any or all of: pointers to media object positions within the media stream; parametric information for characterizing those media objects; metadata for describing such objects; object endpoint information; copies of the media objects; and pointers to files or other databases where individual media objects are stored. Further, in one embodiment, this object database also stores statistical information regarding repeat instances of objects, once found. Note that the term "database" is used here in a general sense. In particular, in alternate embodiments, the system and method described herein constructs its own database, uses the file-system of an operating system, or uses a commercial database package such as, for example an SQL server or Microsoft® Access. Further, also as noted above, one or more databases are used in alternate embodiments for storing any or all of the aforementioned information.

In a tested embodiment, the object database is initially empty. Entries are stored in the object database when it is determined that a media object of a sought class is present in a media stream (see Section 3.1.1 and Section 3.1.2, for example). Note that in another embodiment, when performing direct comparisons, the object database is queried to locate object matches prior to searching the media stream itself. This embodiment operates on the assumption that once a particular media object has been observed in the media stream, it is more likely that that particular media object will repeat within that media stream. Consequently, first querying the object database to locate matching media objects serves to reduce the overall time and computational expense needed to identify matching media objects. These embodiments are discussed in further detail below.

The database performs two basic functions. First it responds to queries for determining if one or more objects matching, or partially matching, either a media object or a certain set of features or parametric information exist in the object database. In response to this query, the object database returns either a list of the stream names and locations of potentially matching objects, as discussed above, or simply the name and location of matching media objects. In one embodiment, if there is no current entry matching the feature list, the object database creates one and adds the stream name and location as a new probable or possible object.

Note that in one embodiment, when returning possibly matching records, the object database presents the records in the order it determines most probable of match. For example, this probability can be based on parameters such as the previously computed similarity between the possible objects and the potential matches. Alternately, a higher probability of match can be returned for records that have already several copies in the object database, as it is more probable that such records will match than those records that have only one copy in the object database. Starting the aforementioned object comparisons with the most probable object matches reduces computational time while increasing overall system performance because such matches are typically identified with fewer detailed comparisons.

The second basic function of the database involves a determination of the object endpoints. In particular, when attempting to determine object endpoints, the object database returns the stream name and location within those streams of each of the repeat copies or instances of an object so that the objects can be aligned and compared as described in the following section.

3.1.4 Object Endpoint Determination:

Over time, as the media stream is processed, the object database naturally becomes increasingly populated with objects, repeat objects, and approximate object locations within the stream. As noted above, records in the database that contain more than one copy or instance of a possible object are assumed to be sought objects. The number of such records in the database will grow at a rate that depends on the frequency with which sought objects are repeated in the target stream, and on the length of the stream being analyzed. In addition to removing the uncertainty as to whether a record in the database represents a sought object or simply a classification error, finding a second copy of a sought object helps determine the endpoints of the object in the stream.

Specifically, as the database becomes increasingly populated with repeat media objects, it becomes increasingly easier to identify the endpoints of those media objects. In general, a determination of the endpoints of media objects is accomplished by comparison and alignment of the media objects identified within the media stream, followed by a determination of where the various instances of a particular media object diverge. As noted above in Section 3.1.2, while a comparison of the possible objects confirms that the same object is present at different locations in the media stream, this comparison, in itself, does not define the boundaries of those objects. However, these boundaries are determinable by comparing the media stream, or a lower-dimensional version of the media stream at those locations, then aligning those portions of the media stream and tracing backwards and forwards in the media stream to identify points within the media stream where the media stream diverges.

For example, in the case of an audio media stream, with N instances of an object in the database record, there are thus N locations where the object occurs in the audio stream. In general, it has been observed that in a direct comparison of a broadcast audio stream, the waveform data can, in some cases, be too noisy to yield a reliable indication of where the various copies are approximately coincident and where they begin to diverge. Where the stream is too noisy for such direct comparison, comparison of a low-dimensional version, or of particular characteristic information, has been observed to provide satisfactory results. For example, in the case of a noisy audio stream, it has been observed that the comparison of particular frequencies or frequency bands, such as a Bark spectra representation, works well for comparison and alignment purposes.

Specifically, in a tested embodiment for extracting media objects from an audio stream, for each of the N copies of the media object, one or more Bark spectra representations are derived from a window of the audio data relatively longer than the object. As described above, a more reliable comparison is achieved through the use of more than one representative Bark band. Note that in a working example of the object extractor applied to an audio stream, Bark bands representing information in the 700 Hz to 1200 Hz range were found especially robust and useful for comparing audio objects. Clearly, the frequency bands chosen for comparison should be tailored to the type of music, speech, or other audio objects in the audio stream. In one embodiment, filtered versions of the selected bands are used to increase robustness further.

Given this example, so long as the selected Bark spectra are approximately the same for all copies, it is assumed that the underlying audio data is also approximately the same. Conversely, when the selected Bark spectra are sufficiently different for all copies it is assumed that the underlying audio data no longer belongs to the object in question. In this manner the selected Bark spectra is traced backwards and forwards within the stream to determine the locations at which divergence occurs in order to determine the boundaries of the object.

In particular, in one embodiment low dimension versions of objects in the database are computed using the Bark spectra decomposition (also known as critical bands). This decomposition is well known to those skilled in the art. This decomposes the signal into a number of different bands. Since they occupy narrow frequency ranges the individual bands can be sampled at much lower rates than the signal they represent. Therefore, the characteristic information computed for objects in the object database can consist of sampled versions of one or more of these bands. For example, in one embodiment the characteristic information consists of a sampled version of Bark band 7 which is centered at 840 Hz.

In another embodiment determining that a target portion of an audio media stream matches an element in the database is done by calculating the cross-correlation of the low dimension version of the database object with a low dimension version of the target portion of the audio stream. A peak in the cross correlation generally implies that two waveforms are approximately equal for at least a portion of their lengths. As is well known to those skilled in the art, there are various techniques to avoid accepting spurious peaks. For example, if a particular local maximum of the cross-correlation is a candidate peak, we may require that the value at the peak is more than a threshold number of standard deviations higher than the mean in a window of values surrounding (but not necessarily including) the peak.

In yet another embodiment the extents or endpoints of the found object is determined by aligning two or more copies of repeating objects. For example, once a match has been found (by detecting a peak in the cross-correlation) the low dimension version of the target portion of the audio stream and the low dimension version of either another section of the stream or a database entry are aligned. The amount by which they are misaligned is determined by the position of the cross-correlation peak. One of the low dimension versions is then normalized so that their values approximately coincide. That is, if the target portion of an audio stream is S, and the matching portion (either from another section of the stream or a database) is G, and it has been determined from the cross-correlation that G and S match with offset o, then S(t), where t is the temporal position within the audio stream, is compared with G(t+o). However a normalization may be necessary before S(t) is approximately equal to G(t+o). Next the beginning point of the object is determined by finding the smallest $t_b$ such that S(t) is approximately equal to G(t+o) for $t>t_b$. Similarly the endpoint of the object is determined by finding the largest $t_e$ such that S(t) is approximately equal to G(t+o) for $t<t_e$. Once this is done S(t) is approximately equal to G(t+o) for $t_b<t<t_e$ and $t_b$ and $t_e$ can be regarded as the approximate endpoints of the object. In some instances it may be necessary to filter the low dimension versions before determining the endpoints.

In one embodiment, determining that S(t) is approximately equal to G(t+o) for $t>t_b$ is done by a bisection method. A location to is found where $S(t_0)$ and $G(t_0+o)$ are approximately equal, and $t_1$ where $S(t_1)$ and $G(t_1+o)$ are not equal, where $t_1<t_0$. The beginning of the object is then determined by comparing small sections of S(t) and G(t+o) for the various values of t determined by the bisection algorithm. The end of the object is determined by first finding to where $S(t_0)$ and $G(t_0+o)$ are approximately equal, and $t_2$ where $S(t_2)$ and $G(t_2+o)$ are not equal, where $t_2>t_0$. Finally, the endpoint of the object is then determined by comparing sections of S(t) and G(t+o) for the various values of t determined by the bisection algorithm.

In still another embodiment, determining that S(t) is approximately equal to G(t+o) for $t>t_b$ is done by finding $t_0$ where $S(t_0)$ and $G(t_0+o)$ are approximately equal, and then decreasing t from $t_0$ until S(t) and G(t+o) are no longer approximately equal. Rather than deciding that S(t) and G(t+o) are no longer approximately equal when their absolute difference exceeds some threshold at a single value of t, it is generally more robust to make that decision when their absolute difference has exceeded some threshold for a certain minimum range of values, or where the accumulated absolute difference exceeds some threshold. Similarly the endpoint is determined by increasing t from $t_0$ until S(t) and G(t+o) are no longer approximately equal.

In operation, it was observed that among several instances of an object, such as broadcast audio from a radio or TV station, it is uncommon for all of the objects to be of precisely the same length. For example, in the case of a 6-minute object, it may sometimes be played all the way from the beginning to end, sometimes be shortened at beginning and/or end, and sometimes be corrupted by introductory voiceover or the fade-out or fade-in of the previous or next object.

Given this likely discrepancy in the length of repeat objects, it is necessary to determine the point at which each copy diverges from its companion copies. As noted above, in one embodiment, this is achieved for the audio stream case by comparing the selected Bark bands of each copy against the median of the selected Bark bands of all the copies. Moving backwards in time, if one copy sufficiently diverges from the median for a sufficiently long interval, then it is decided that this instance of the object began there. It is then excluded from the calculation of the median, at which point a search for the next copy to diverge is performed by continuing to move backward in time within the object copies. In this manner, eventually a point is reached where only two copies remain. Similarly, moving forward in time, the points where each of the copies diverges from the median are determined in order to arrive at a point where only two copies remain.

One simple approach to determining the endpoints of an instance of the object is to then simply select among the instances the one for which the right endpoint and left endpoint are greatest. This can serve as a representative copy of the object. It is necessary to be careful however that one does not include a station jingle which occurs before two different instances of a song as being part of the object. Clearly, more sophisticated algorithms to extract a representative copy from the N found copies can be employed, and the methods described above are for purposes of illustration and explanation only. The best instance identified can then be used as representative of all others.

In a related embodiment once a match between the target segment of the stream and another segment of the stream has been found, and the segmentation has been performed, the search is continued for other instances of the object in the remainder of the stream. In a tested embodiment it proves advantageous to replace the target segment of the stream with a segment that contains all of the segmented objects and is zero elsewhere. This reduces the probability of spurious peaks when seeking matches in remainder portions of the stream. For example, if the segments at $t_i$ and $t_j$ have been determined to match, one or other of the endpoints of the object might lie outside the segments centered at $t_i$ and $t_j$, and those segments might contain data that is not part of the object. It improves the reliability of subsequent match decisions to compare against a segment that contains the entire object and nothing else.

Note that comparison and alignment of media objects other than audio objects such as songs is performed in a very similar manner. Specifically, the media stream is either compared directly, unless too noisy, or a low-dimensional or filtered version of the media stream is compared directly. Those segments of the media stream that are found to match are then aligned for the purpose of endpoint determination as described above.

In further embodiments, various computational efficiency issues are addressed. In particular, in the case of an audio stream, the techniques described above in Sections 3.1.1, 3.1.2, and 3.1.4 all use frequency selective representations of the audio, such as Bark spectra. While it is possible to recalculate this every time, it is more efficient to calculate the frequency representations when the stream is first processed, as described in Section 3.1.1, and to then store a companion stream of the selected Bark bands, either in the object database or elsewhere, to be used later. Since the Bark bands are typically sampled at a far lower rate than the original audio rate, this typically represents a very small amount of storage for a large improvement in efficiency. Similar processing is done in the case of video or image-type media objects embedded in an audio/video-type media stream, such as a television broadcast.

Further, as noted above, in one embodiment, the speed of media object identification in a media stream is dramatically increased by restricting searches of previously identified portions of the media stream. For example if a segment of the stream centered at $t_j$ has, from an earlier part of the search, already been determined to contain one or more objects, then it may be excluded from subsequent examination. For Example, if the search is over segments having a length twice the average sought object length, and two objects have already been located in the segment at $t_j$, then clearly there is no possibility of another object also being located there, and this segment can be excluded from the search.

In another embodiment, the speed of media object identification in a media stream is increased by first querying a database of previously identified media objects prior to searching the media stream. Further, in a related embodiment, the media stream is analyzed in segments corresponding to a period of time sufficient to allow for one or more repeat instances of media objects, followed a database query then a search of the media stream, if necessary. The operation of each of these alternate embodiments is discussed in greater detail in the following sections.

Further, in a related embodiment, the media stream is analyzed by first analyzing a portion of the stream large enough to contain repetition of at least the most common repeating objects in the stream. A database of the objects that repeat on this first portion of the stream is maintained. The remainder portion of the stream is then analyzed, by first determining if segments match any object in the database, and then subsequently checking against the rest of the stream.

3.2 System Operation:

As noted above, the program modules described in Section 2.0 with reference to FIG. 2, and in view of the more detailed description provided in Section 3.1, are employed for automatically identifying and segmenting repeating objects in a media stream. This process is depicted in the flow diagrams of FIG. 3A, FIG. 3B, FIG. 3C, FIG. 4, and FIG. 5, which represent alternate embodiments of the object extractor. It should be noted that the boxes and interconnections between boxes that are represented by broken or dashed lines in FIG. 3A, FIG. 3B, FIG. 3C, FIG. 4, and FIG. 5 represent further alternate embodiments of the object extractor, and that any or all of these alternate embodiments, as described below, may be used in combination.

3.2.1 Basic System Operation:

Referring now to FIG. 3A through FIG. 5 in combination with FIG. 2, in one embodiment, the process can be generally described as an object extractor that locates, identifies and segments media objects from a media stream 210. In general, a first portion or segment of the media stream $t_i$ is selected. Next, this segment $t_i$ is sequentially compared to subsequent segments $t_j$ within the media stream until the end of the stream is reached. At that point, a new $t_i$ segment of the media stream subsequent to the prior $t_i$ is selected, and again compared to subsequent segments $t_j$ within the media stream until the end of the stream is reached. These steps repeat until the entire stream is analyzed to locate and identify repeating media objects with the media stream. Further, as discussed below, with respect to FIG. 3A, FIG. 3B, FIG. 3C, FIG. 4, and FIG. 5, there are a number of alternate embodiments for implementing, and accelerating the search for repeating objects within the media stream.

Figure 3A:
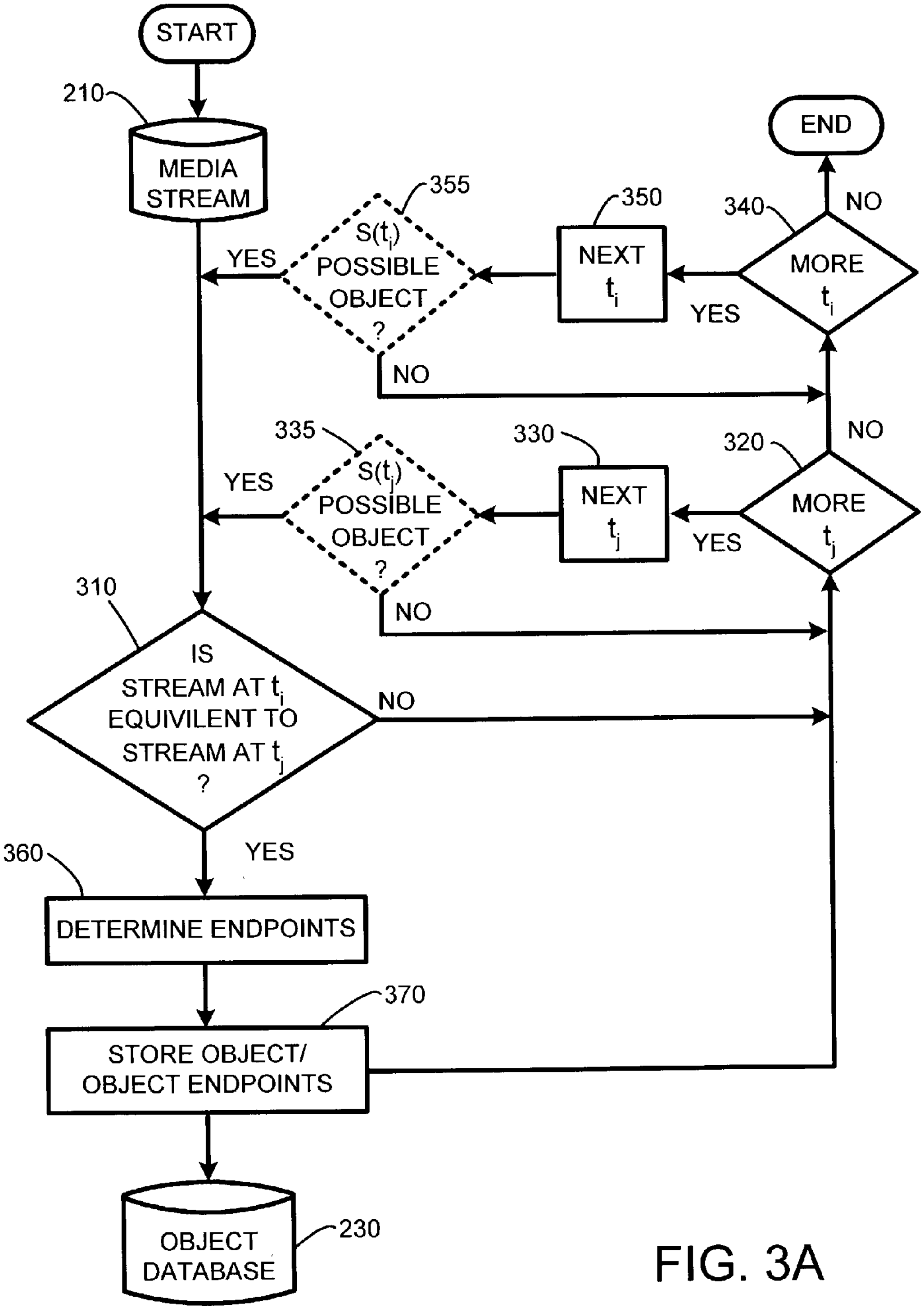
FIG. 3A illustrates an exemplary system flow diagram for automatically identifying and segmenting repeating media objects in a media stream.

In particular, as illustrated by FIG. 3A, a system and method for automatically identifying and segmenting repeating objects in a media stream 210 containing audio and/or video information begins by determining 310 whether segments of the media stream at locations $t_i$ and $t_j$ within the stream represent the same object. As noted above, the segments selected for comparison can be selected beginning at either end of the media stream, or can be selected randomly. However, simply starting at the beginning at the media stream, and selecting an initial segment at time $t_i=t_0$ has been found to be an efficient choice when subsequently selecting segments of the media stream beginning at time $t_j=t_1$ for comparison.

In any event, this determination 310 is made by simply comparing the segments of the media stream at locations $t_i$ and $t_j$. If the two segments, $t_i$ and $t_j$, are determined 310 to represent the same media object, then the endpoints of the objects are automatically determined 360 as described above. Once the endpoints have been found 360, then either the endpoints for the media object located around time $t_i$ and the matching object located around time $t_j$ are stored 370 in the object database 230, or the media objects themselves or pointers to those media objects, are stored in the object database. Again, it should be noted that as discussed above, the size of the segments of the media stream which are to be compared is chosen to be larger than expected media objects within the media stream. Consequently, it is to be expected that only portions of the compared segments of the media stream will actually match, rather than entire segments unless media objects are consistently played in the same order within the media stream.

If it is determined 310 that the two segments of the media stream at locations $t_i$ and $t_j$ do not represent the same media object, then if more unselected segments of the media stream are available 320, then a new or next segment 330 of the media stream at location $t_{j+1}$ is selected as the new $t_j$. This new $t_j$ segment of the media stream is then compared to the existing segment $t_i$ to determine 310 whether two segments represent the same media object as described above. Again, if the segments are determined to 310 to represent the same media object, then the endpoints of the objects are automatically determined 360, and the information is stored 370 to the object database 230 as described above.

Conversely, if it is determined 310 that the two segments of the media stream at locations $t_i$ and $t_j$ do not represent the same media object, and that no more unselected segments of the media stream are available 320 (because the entire media stream has already been selected for comparison to the segment of the media stream represented by $t_i$), then if the end of the media stream has not yet been reached, and more segments $t_i$ are available 340, then a new or next segment 350 of the media stream at location $t_{j+1}$ is selected as the new $t_i$. This new to segment of the media stream is then compared to a next segment $t_j$ to determine 310 whether two segments represent the same media object as described above. For example, assuming that the first comparison was made beginning with the segment $t_i$ at time $t_0$ and the segment $t_j$ at time $t_1$, then the second round of comparisons would begin by comparing $t_{j+1}$ at time $t_1$ to $t_{j+1}$ at time $t_2$, then time $t_3$, and so on until the end of the media stream is reached, at which point a new $t_i$ at time $t_2$ is selected. Again, if the segments are determined to 310 to represent the same media object, then the endpoints of the objects are automatically determined 360, and the information is stored 370 to the object database 230 as described above.

In a related embodiment, also illustrated by FIG. 3A, every segment is first examined to determine the probability that it contains an object of the sought type prior to comparing it to other objects in the stream. If the probability is deemed to be higher than a predetermined threshold then the comparisons proceed. If the probability is below the threshold, however, that segment may be skipped in the interests of efficiency.

In particular, in this alternate embodiment, each time that a new $t_j$ or $t_i$ is selected, 330 or 350, respectively, the next step is to determine, 335 or 355, respectively, whether the particular $t_j$ or $t_i$ represents a possible object. As noted above, the procedures for determining whether a particular segment of the media stream represents a possible object include employing a suite of object dependent algorithms to target different aspects of the media stream for identifying possible objects within the media stream. If the particular segment, either $t_j$ or $t_i$, is determined 335 or 355 to represent a possible object, then the aforementioned comparison 310 between r $t_i$ and $t_j$ proceeds as described above. However, in the event that the particular segment, either $t_j$ or $t_i$, is determined 335 or 355 not to represent a possible object, then a new segment is selected 320/330, or 340/350 as described above. This embodiment is advantageous in that it avoids comparisons that are relatively computationally expensive in relative to determining the probability that a media object possibly exists within the current segment of the media stream.

In either embodiment, the steps described above then repeat until every segment of the media stream has been compared against every other subsequent segment of the media stream for purposes of identifying repeating media objects in the media stream.

Figure 3B:
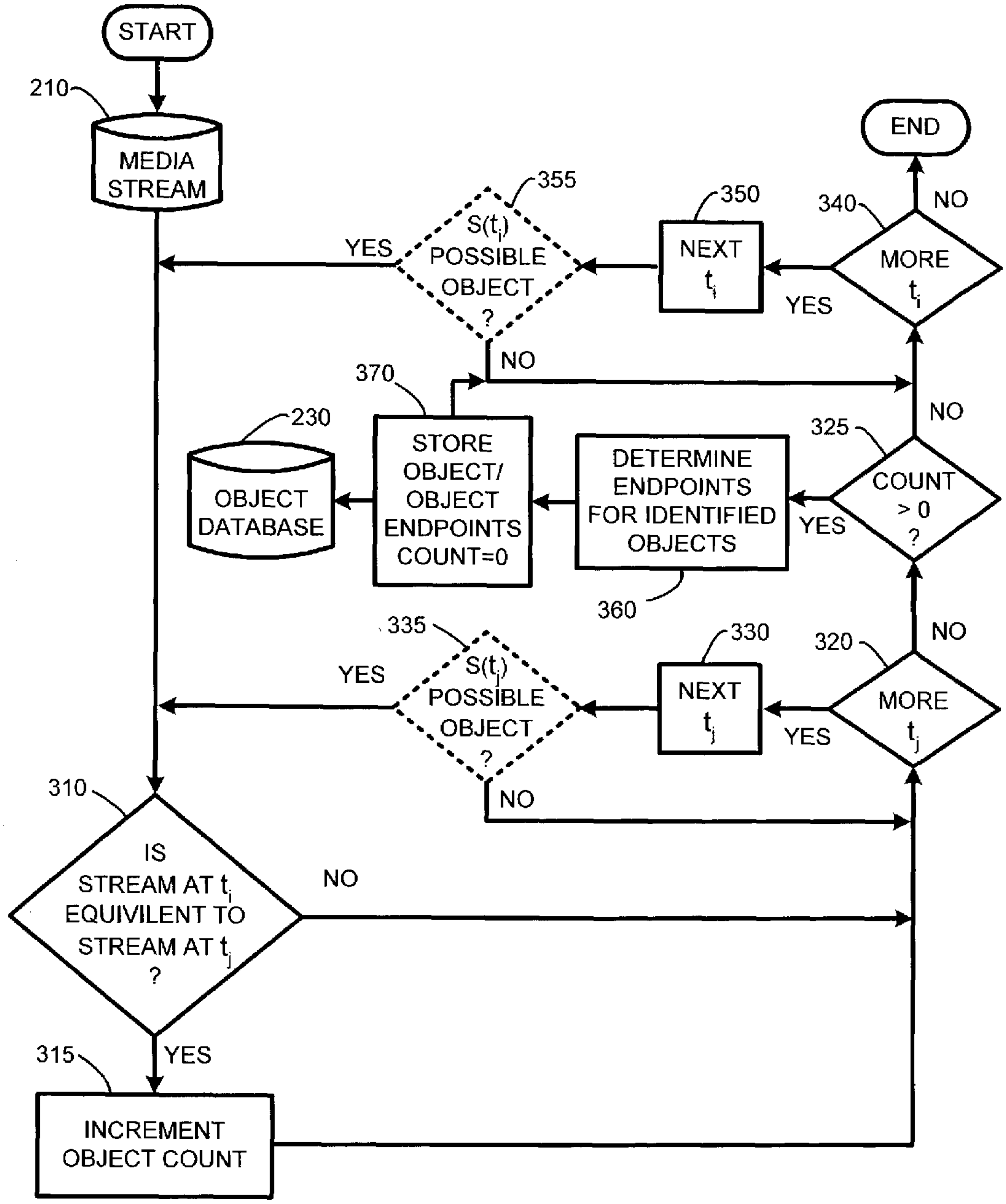
FIG. 3B illustrates an alternate embodiment of the exemplary system flow diagram of FIG. 3A for automatically identifying and segmenting repeating media objects in a media stream.

FIG. 3B illustrates a related embodiment. In general, the embodiments illustrated by FIG. 3B differs from the embodiments illustrated by FIG. 3A in that the determination of endpoints for repeating objects is deferred until each pass through the media stream has been accomplished.

Specifically, as described above, the process operates by sequentially comparing segments $t_i$ of the media stream 210 to subsequent segments $t_j$ within the media stream until the end of the stream is reached. Again, at that point, a new $t_i$ segment of the media stream subsequent to the prior $t_i$ is selected, and again compared to subsequent segments $t_j$ within the media stream until the end of the stream is reached. These steps repeat until the entire stream is analyzed to locate and identify repeating media objects with the media stream.

However, in the embodiments described with respect to FIG. 3A, as soon as the comparison 310 between $t_i$ and $t_j$ indicated a match, the endpoints of the matching objects were determined 360 and stored 370 in the object database 230. In contrast, in the embodiments illustrated by FIG. 3B, an object counter 315 initialized at zero is incremented each time the comparison 310 between $t_i$ and $t_j$ indicates a match. At this point, instead of determining the endpoints for the matching objects, the next $t_j$ is selected for comparison 320/330/335, and again compared to the current $t_i$. This repeats for all $t_j$ segments in the media stream until the entire stream has been analyzed, at which point, if the count of matching objects is greater than zero 325 than the endpoints are determined 360 for all the segments $t_j$ that represent objects matching the current segment $t_i$. Next, either the object endpoints, or the objects themselves are stored 370 in the object database 230 as described above.

At this point, the next segment $t_i$ is selected 340/350/355, as described above, for another round of comparisons 310 to subsequent $t_j$ segments. The steps described above then repeat until every segment of the media stream has been compared against every other subsequent segment of the media stream for purposes of identifying repeating media objects in the media stream.

However, while the embodiments described in this section serve to identify repeating objects in the media stream, a large number of unnecessary comparisons are still made. For example, if a given object has already been identified within the media stream, it is likely that the object will be repeated in the media stream. Consequently, first comparing the current segment $t_i$ to each of the objects in the database before comparing segments $t_i$ and $t_j$ 310 is used in alternate embodiments to reduce or eliminate some of the relatively computationally expensive comparisons needed to completely analyze a particular media stream. Therefore, as discussed in the following section, the database 230 is used for initial comparisons as each segment $t_i$ of the media stream 210 is selected.

Figure 3C:
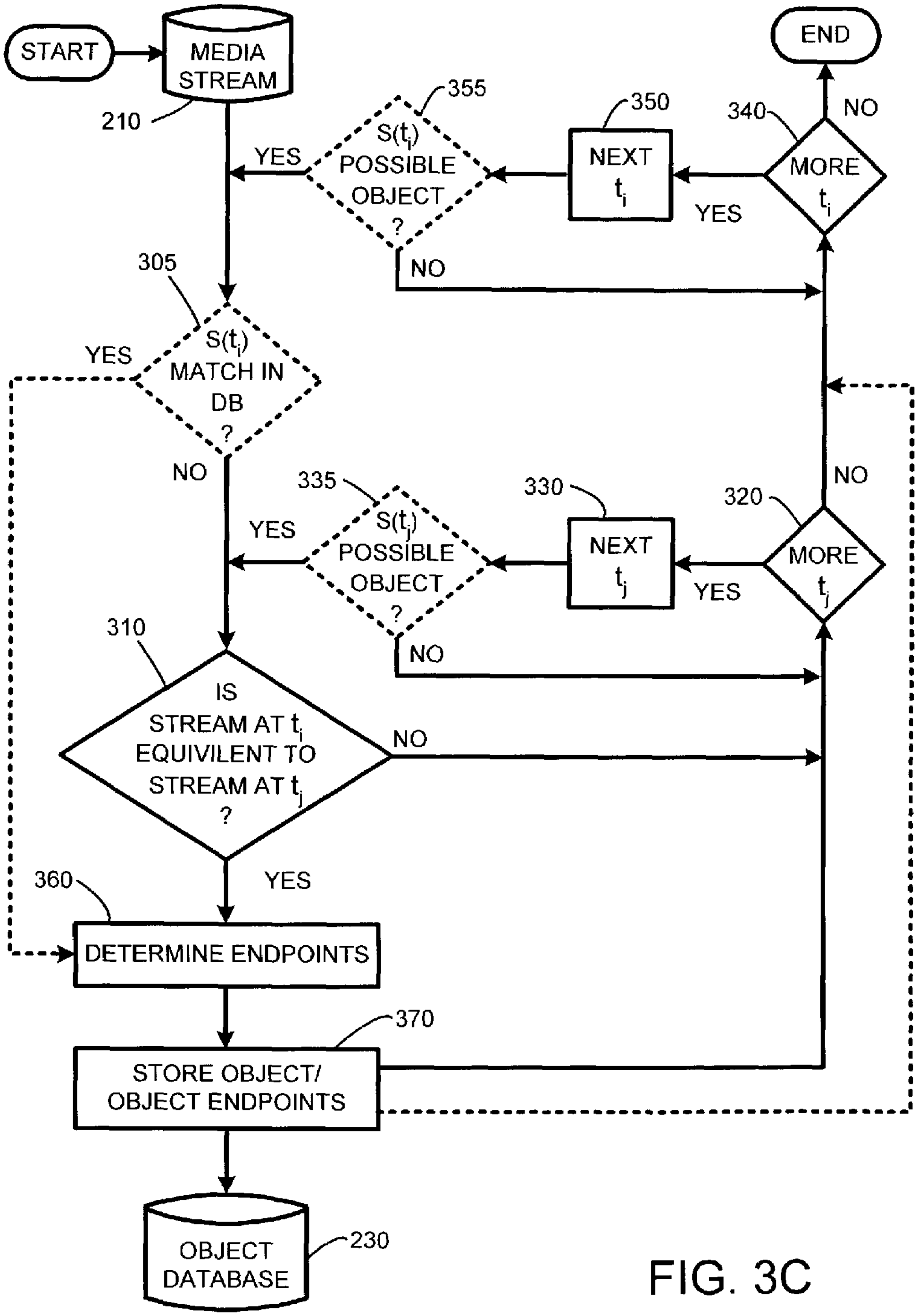
FIG. 3C illustrates an alternate embodiment of the exemplary system flow diagram of FIG. 3A for automatically identifying and segmenting repeating media objects in a media stream.

3.2.2 System Operation with Initial Database Comparisons:

In another related embodiment, as illustrated by FIG. 3C, the number of comparisons 310 between segments in the media stream 210 are reduced by first querying a database of previously identified media objects 230. In particular, the embodiments illustrated by FIG. 3C differ from the embodiments illustrated by FIG. 3A in that after each segment $t_i$ of the media stream 210 is selected, it is first compared 305 to the object database 230 to determine whether the current segment matches an object in the database. If a match is identified 305 between the current segment and an object in the database 230, then the endpoints of the object represented by the current segment $t_i$ are determined 360. Next, as described above, either the object endpoints, or the objects themselves, are stored 370 in the object database 230. Consequently, the current segment $t_i$ is identified without an exhaustive search of the media stream by simply querying the object database 230 to locate matching objects.

Next, in one embodiment, if a match was not identified 305 in the object database 230, the process for comparing 310 the current segment $t_i$ to subsequent segments $t_j$ 320/330/335 proceeds as described above until the end of the stream is reached, at which point a new segment $t_i$ is chosen 340/350/355, to begin the process again. Conversely, if a match is identified 305 in the object database 230 for the current segment $t_i$, the endpoints are determined 360 and stored 370 as described above, followed by selection of a new $t_i$ 340/350/355 to begin the process again. These steps are then repeated until all segments $t_i$ in the media stream 210 have been analyzed to determine whether they represent repeating objects.

In further related embodiments, the initial database query 305 is delayed until such time as the database is at least partially populated with identified objects. For example, if a particular media stream is recorded or otherwise captured over a long period, then an initial analysis of a portion of the media stream is performed as described above with respect to FIG. 3A or 3B, followed by the aforementioned embodiment involving the initial database queries. This embodiment works well in an environment where objects repeat frequently in a media stream because the initial population of the database serves to provide a relatively good data set for identifying repeat objects. Note also, that as the database 230 becomes increasing populated, it also becomes more probable that repeating objects embedded within the media stream can be identified by a database query alone, rather than an exhaustive search for matches in the media stream.

In yet another related embodiment, database 230 pre-populated with known objects is used to identify repeating objects within the media stream. This database 230 can be prepared using any of the aforementioned embodiments, or can be imported from or provided by other conventional sources.

However, while the embodiments described in this section have been shown to reduce the number of comparisons performed to completely analyze a particular media stream, a large number of unnecessary comparisons are still made. For example, if a given segment of the media stream at time $t_i$ or $t_j$ has already been identified as belonging to a particular media object, re-comparing the already identified segments to other segments serves no real utility. Consequently, as discussed in the following sections, information relating to which portions of the media stream have already been identified is used to rapidly collapse the search time by restricting the search for matching sections to those sections of the media stream which have not yet been identified.

Figure 4:
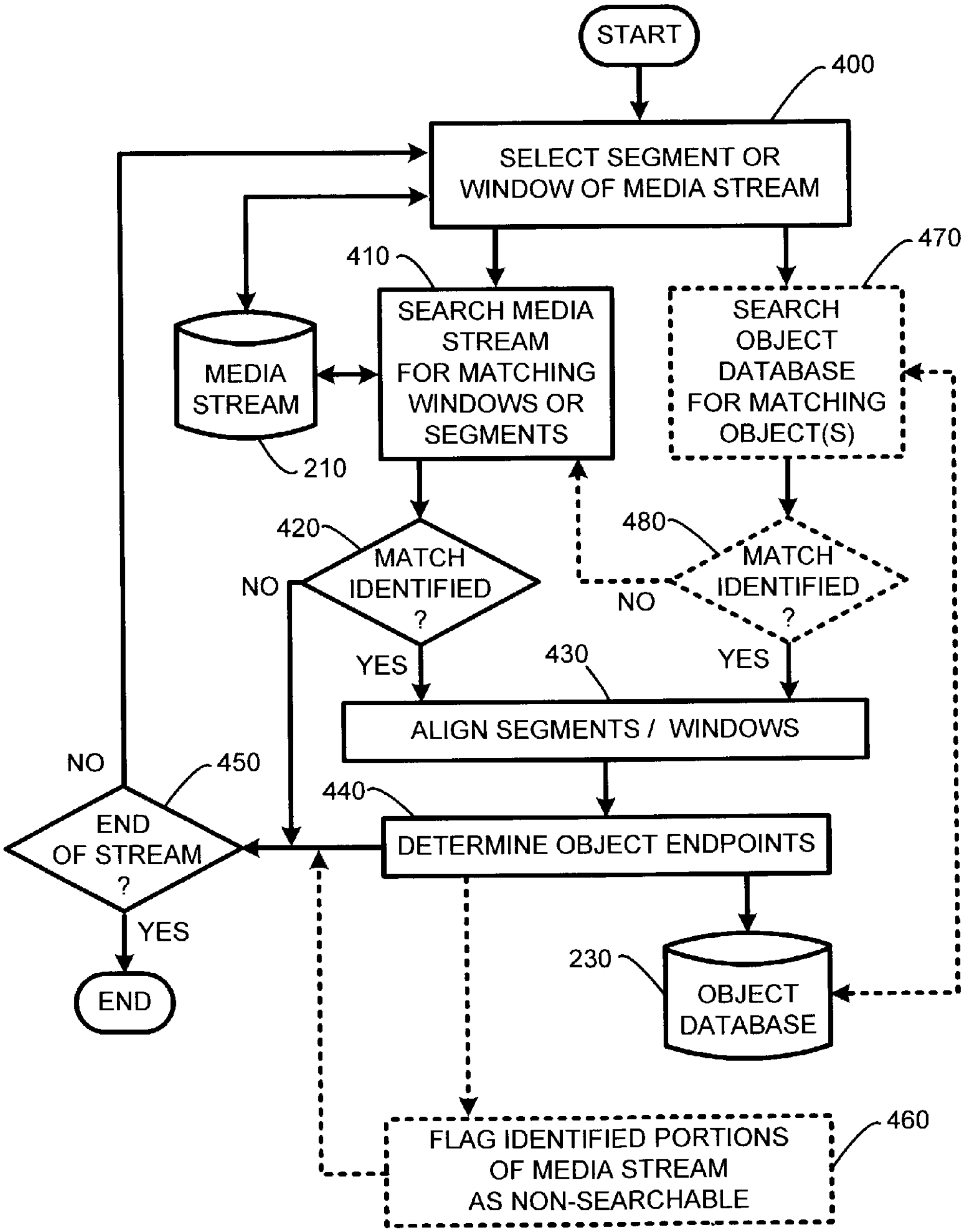
FIG. 4 illustrates an alternate exemplary system flow diagram for automatically identifying and segmenting repeating media objects in a media stream.

3.2.3 System Operation with Progressive Stream Search Restrictions:

Referring now to FIG. 4 in combination with FIG. 2, in one embodiment, the process can be generally described as an object extractor that locates, identifies and segments media objects from a media stream while flagging previously identified portions of the media stream so that they are not searched over and over again.

In particular, as illustrated by FIG. 4, a system and method for automatically identifying and segmenting repeating objects in a media stream begins by selecting 400 a first window or segment of a media stream 210 containing audio and/or video information. Next, in one embodiment, the media stream is then searched 410 to identify all windows or segments of the media stream having portions which match a portion of the selected segment or window 400. Note that in a related embodiment, as discussed in further detail below, the media stream is analyzed in segments over a period of time sufficient to allow for one or more repeat instances of media objects rather than searching 410 the entire media stream for matching segments. For example, if a media stream is recorded for a week, then the period of time for the first search of the media stream might be one day. Again, the period of time over which the media stream is searched in this embodiment is simply a period of time which is sufficient to allow for one or more repeat instances of media objects.

In either case, once either all or part of the media stream has been searched 410 to identify all portions of the media stream which match 420 a portion of the selected window or segment 400 then the matching portions are aligned 430, with this alignment then being used to determine object endpoints 440 as described above. Once the endpoints have been determined 440, then, either the endpoints for the matching media objects are stored in the object database 230, or the media objects themselves or pointers to those media objects, are stored in the object database.

Further, in one embodiment, those portions of the media stream which have already been identified are flagged and restricted from being searched again 460. This particular embodiment serves to rapidly collapse the available search area of the media stream as repeat objects are identified. Again, it should be noted that as discussed above, the size of the segments of the media stream which are to be compared is chosen to be larger than expected media objects within the media stream. Consequently, it is to be expected that only portions of the compared segments of the media stream will actually match, rather than entire segments unless media objects are consistently played in the same order within the media stream.

Therefore, in one embodiment, only those portions of each segment of the media stream which have actually been identified are flagged 460. However, in a media stream where media objects are found to frequently repeat, it has been observed that simply restricting the entire segment from further searches still allows for the identification of the majority of repeating objects within the media stream. In another related embodiment, where only negligible portions of a particular segment are left unidentified, those negligible portions are simply ignored. In still another related embodiment, partial segments left after restricting portions of the segment from further searching 460 are simply combined with either prior or subsequent segments for purposes of comparisons to newly selected segments 400. Each of these embodiments serves to improve overall system performance by making the search for matches within the media stream more efficient.

Once the object endpoints have been determined 440, when no matches have been identified 420, or after portions of the media stream have been flagged to prevent further searches of those portions 460, a check is made to see if the currently selected segment 400 of the media stream represents the end of the media stream 450. If the currently selected segment 400 of the media stream does represent the end of the media stream 450, then the process is complete and the search is terminated. However, if the end of the media stream has not been reached 450, then a next segment of the media stream is selected, and compared to the remainder of the media stream by searching through the media stream 410 to locate matching segments. The steps described above for identifying matches 420, aligning matching segments 430, determining endpoints 440, and storing the endpoint or object information in the object database 230 are then repeated as described above until the end of the media stream has been reached.

Note that there is no need to search backwards in the media stream, as the previously selected segment has already been compared to the currently selected segment. Further, in the embodiment where particular segments or portions of the media stream have been flagged as identified 460, these segments are skipped in the search 410. As noted above, as more media objects are identified in the stream, skipping identified portions of the media stream serves to rapidly collapse the available search space, thereby dramatically increasing system efficiency in comparison to the basic brute force approach described in Section 3.2.1.

In another embodiment, the speed and efficiency of identifying repeat objects in the media stream is further increased by first searching 470 the object database 230 to identify matching objects. In particular, in this embodiment, once a segment of the media stream has been selected 400, this segment is first compared to previously identified segments based on the theory that once a media object has been observed to repeat in a media stream, it is more likely to repeat again in that media stream. If a match is identified 480 in the object database 230, then the steps described above for aligning matching segments 430, determining endpoints 440, and storing the endpoint or object information in the object database 230 are then repeated as described above until the end of the media stream has been reached.

Each of the aforementioned searching embodiments (e.g., 410, 470, and 460) are further improved when combined with the embodiment wherein the media stream is analyzed in segments over a period of time sufficient to allow for one or more repeat instances of media objects rather than searching 410 the entire media stream for matching segments. For example, if a media stream is recorded for a week, than the period of time for the first search of the media stream might be one day. Thus, in this embodiment, the media stream is first searched 410 over the first time period, i.e., a first day from a week long media recording, with the endpoints of matching media objects, or the objects themselves being stored in the object database 230 as described above. Subsequent searches through the remainder of the media stream, or subsequent stretches of the media stream (i.e., a second or subsequent day of the week long recording of the media stream), are then first directed to the object database (470 and 230) to identify matches as described above.

Figure 5:
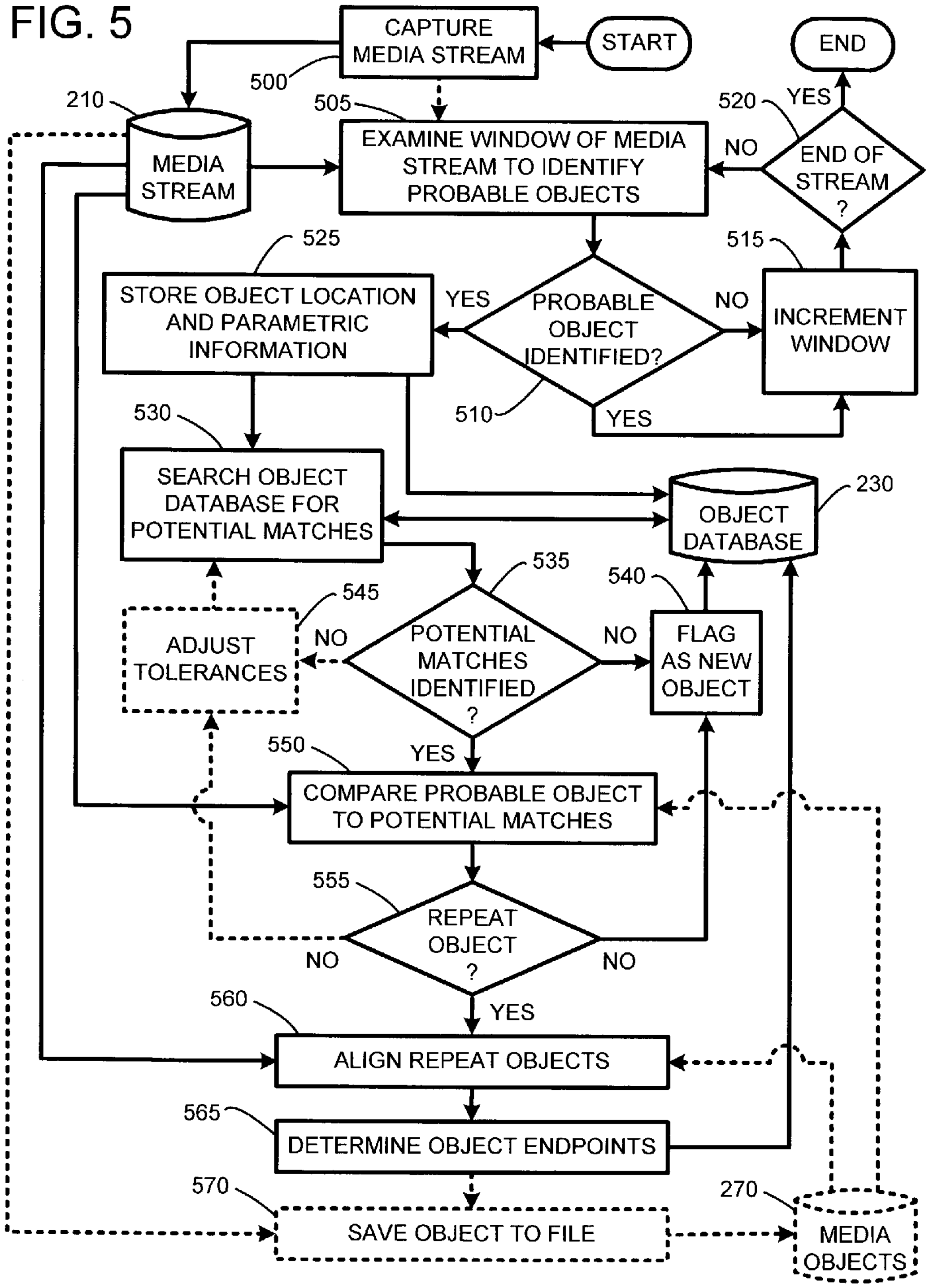
FIG. 5 illustrates an alternate exemplary system flow diagram for automatically identifying and segmenting repeating media objects in a media stream.

3.2.4 System Operation with Initial Detection of Probable Objects:

Referring now to FIG. 5 in combination with FIG. 2, in one embodiment, the process can be generally described as an object extractor that locates, identifies and segments media objects from a media stream by first identifying probable or possible objects in the media stream. In particular, as illustrated by FIG. 5, a system and method for automatically identifying and segmenting repeating objects in a media stream begins by capturing 500 a media stream 210 containing audio and/or video information. The media stream 210 is captured using any of a number of conventional techniques, such as, for example, an audio or video capture device connected to a computer for capturing a radio or television/video broadcast media stream. Such media capture techniques are well known to those skilled in the art, and will not described herein. Once captured, the media stream 210 is stored in a computer file or database. In one embodiment, the media stream 210 is compressed using conventional techniques for compression of audio and/or video media.

The media stream 210 is then examined in an attempt to identify possible or probable media objects embedded within the media stream. This examination of the media stream 210 is accomplished by examining a window 505 representing a portion of the media stream. As noted above, the examination of the media stream 210 to detect possible objects uses one or more detection algorithms that are tailored to the type of media content being examined. In general, as discussed in detail above, these detection algorithms compute parametric information for characterizing the portion of the media stream being analyzed. In an alternate embodiment, the media stream is examined 505 in real time as it is captured 500 and stored 210.

If a possible object is not identified in the current window or portion of the media stream 210 being analyzed, then the window is incremented 515 to examine a next section of the media stream in an attempt to identify a possible object. If a possible or probable object is identified 510, then the location or position of the possible object within the media stream 210 is stored 525 in the object database 230. In addition, the parametric information for characterizing the possible object is also stored 525 in the object database 230. Note that as discussed above, this object database 230 is initially empty, and the first entry in the object database corresponds to the first possible object that is detected in the media stream 210. Alternately, the object database 230 is pre-populated with results from the analysis or search of a previously captured media stream. Incrementing of the window 515 examination of the window 505 continues until the end of the media stream is reached 520.

Following the detection of a possible object within the media stream 210, the object database 230 is searched 530 to identify potential matches, i.e., repeat instances, for the possible object. In general, this database query is done using the parametric information for characterizing the possible object. Note that exact matches are not required, or even expected, in order to identify potential matches. In fact, a similarity threshold for performing this initial search for potential matches is used. This similarity threshold, or "detection threshold, can be set to be any desired percentage match between one or more features of the parametric information for characterizing the possible object and the potential matches.

If no potential matches are identified, 535, then the possible object is flagged as a new object 540 in the object database 230. Alternately, in another embodiment, if either no potential matches, or too few potential matches are identified 535, then the detection threshold is lowered 545 in order to increase the number of potential matches identified by the database search 530. Conversely, in still another embodiment, if too many potential matches are identified 535, then the detection threshold is raised so as to limit the number of comparisons performed.

Once one or more potential matches have been identified 535, a detailed comparison 550 between the possible object one or more of the potentially matching objects is performed. This detailed comparison includes either a direct comparison of portions of the media stream 210 representing the possible object and the potential matches, or a comparison between a lower-dimensional version of the portions of the media stream representing the possible object and the potential matches. Note that while this comparison makes use of the stored media stream, the comparison can also be done using previously located and stored media objects 270.

If the detailed comparison 550 fails to locate an object match 555, the possible object is flagged as a new object 540 in the object database 230. Alternately, in another embodiment, if no object match is identified 555, then the 10 detection threshold is lowered 545, and a new database search 530 is performed to identify additional potential matches. Again, any potential matches are compared 550 to the possible object to determine whether the possible object matches any object already in the object database 230.

Once the detailed comparison has identified a match or a repeat instance of the possible object, the possible object is flagged as a repeating object in the object database 230. Each repeating object is then aligned 560 with each previously identified repeat instance of the object. As discussed in detail above, the object endpoints are then determined 565 by searching backwards and forwards among each of the repeating object instances to identify the furthest extents at which each object is approximately equal. Identifying the extents of each object in this manner serves to identify the object endpoints. This media object endpoint information is then stored in the object database 230.

Finally, in still another embodiment, once the object endpoints have been identified 565, the endpoint information is used to copy or save 570 the section of the media stream corresponding to those endpoints to a separate file or database of individual media objects 270.

As noted above, the aforementioned processes are repeated, while the portion of the media stream 210 that is being examined is continuously incremented until such time as the entire media stream has been examined 520, or until a user terminates the examination.

4.0 Additional Embodiments:

As noted above, media streams captured for purposes of segmenting and identifying media objects in the media stream can be derived from any conventional broadcast source, such as, for example, an audio, video, or audio/video broadcast via radio, television, the Internet, or other network. With respect to a combined audio/video broadcast, as is typical with television-type broadcasts, it should be noted that the audio portion of the combined audio/video broadcast is synchronized with the video portion. In other words, as is well known, the audio portion of an audio/video broadcast coincides with the video portion of the broadcast. Consequently, identifying repeating audio objects within the combined audio/video stream is a convenient and computationally inexpensive way to identify repeating video objects within the audio/video stream.

In particular, in one embodiment, by first identifying repeating audio objects in the audio stream, identifying the times $t_b$ and $t_e$ at which those audio objects begin and end (i.e., the endpoints of the audio object), and then segmenting the audio/video stream at those times, video objects are also identified and segmented along with the audio objects from the combined audio/video stream.

For example, a typical commercial or advertisement is often seen to frequently repeat on any given day on any given television station. Recording the audio/video stream of that television station, then processing the audio portion of the television broadcast will serve to identify the audio portions of those repeating advertisements. Further, because the audio is synchronized with the video portion of the stream, the location of repeating advertisements within the television broadcast can be readily determined in the manner described above. Once the location is identified, such advertisements can be flagged for any special processing desired.

The foregoing description of the invention has been presented for the purposes of illustration and description. It is not intended to be exhaustive or to limit the invention to the precise form disclosed. Many modifications and variations are possible in light of the above teaching. Further, it should be noted that any or all of the aforementioned alternate embodiments may be used in any combination desired to form additional hybrid embodiments of the object extractor described herein. It is intended that the scope of the invention be limited not by this detailed description, but rather by the claims appended hereto.

What is claimed is:

1. A computer storage media having computer executable instructions for identifying repeating media objects within a media stream, comprising:

capturing a media stream;

examining the media stream to locate possible media objects within the stream;

storing parametric information for each possible object in an object database;

searching the database to identify media objects that potentially match each possible media object; and comparing one or more potentially matching media objects to each possible media object to identify repeating media objects by comparing a portion of the media stream centered on a location of each potentially matching media object to a portion of the media stream centered on a location of each possible media object.

2. The computer storage media of claim 1 further comprising aligning each repeating instance of each repeating media object to identify endpoints of each repeating media object.

3. The computer storage media of claim 2 further comprising storing the endpoint information for each repeating media object in the object database.

4. The computer storage media of claim 2 wherein identifying endpoints of each repeating media object comprises aligning each repeating instance of each repeating media object and tracing backwards and forwards in each of the aligned media objects to determine locations within the media stream where each aligned media object is still approximately equivalent to the other aligned media objects.

5. The computer storage media of claim 4 wherein the locations within the media stream which each aligned media object is still approximately equivalent to the other aligned media objects correspond to the endpoints of each repeating media object.

6. The computer storage media of claim 1 wherein the media stream is an audio media stream.

7. The computer storage media of claim 1 wherein the media stream is a video stream.

8. The computer storage media of claim 1 wherein the media objects are any of songs, music, advertisements, video clips, station identifiers, speech, images, and image sequences.

9. The computer storage media of claim 1 wherein capturing the media stream comprises receiving and storing a broadcast media stream.

10. The computer storage media of claim 1 wherein examining the media stream to locate possible media objects within the stream comprises computing parametric information for at least one segment of the media stream, and analyzing the parametric information to determine whether the parametric information represents a possible media object.

11. The computer storage media of claim 1 wherein searching the database to identify media objects that potentially match each possible media object comprises corn paring the parametric information for each possible object to previous entries in the object database to locate similar possible objects.

12. The computer storage media of claim 1 wherein comparing one or more potentially matching media objects to each possible media object further comprises comparing a low-dimensional version of portions of the media stream centered on a location of each potentially matching media object to a low-dimensional version of a portion of the media stream centered on a location each possible media object.

13. The computer storage media of claim 1 wherein comparing one or more potentially matching media objects to each possible media object further comprises:

computing characteristic information from portions of the media stream centered on a location of each potentially matching media object;

computing characteristic information from a portion of the media stream centered on a location each possible media object; and comparing the characteristic information for each potentially matching media object to the characteristic information each possible object.

14. The computer storage media of claim 1 further comprising storing at least one representative copy of each repeating media object on a computer readable medium.

15. A system for locating and identifying media objects within a media stream comprising:

a device for storing at least one media stream on a computer readable storage device;

a device for computing parametric information for at least one portion of each media stream, and storing the parametric information in an object database;

a device for analyzing the parametric information to determine whether the parametric information corresponds to a class of sought media objects;

a device for flagging each portion of each media stream having parametric information that corresponds to a class of sought media objects as a possible object;

a device for searching the object database to locate potentially matching possible objects;

a device for comparing at least two potentially matching possible objects to determine whether any possible objects represent repeat instances of a media object by comparing low-dimensional versions of portions of the media stream centered on a location of each potentially matching possible object to determine whether any of the portions represent a repeat instance of a media object; and a device for locating media objects in each media stream by characterizing any repeat instances of a media object as an identified media object.

16. The system of claim 15 further comprising automatically aligning each repeat instance of a media object, and comparing the aligned repeat instances of the media objects to determine the endpoints for each identified media object.

17. The system of claim 16 wherein comparing the aligned repeat instances of the media objects to determine the endpoints for each identified media object comprises aligning the repeat instances relative to one instance and then tracing backwards and forwards in each of the aligned instances to determine furthest extents at which each instance is still approximately equivalent to the other instances, and wherein the furthest extents correspond to the endpoints of each identified media object.

18. The system of claim 15 wherein at least one media stream is an audio radio broadcast stream.

19. The system of claim 18 wherein the class of sought media objects includes songs and music.

20. The system of claim 19 wherein computing parametric information for at least one portion of each media stream comprises computing at least one of beats per minute, stereo information, energy ratio per audio channel, and energy content of pre-selected frequency bands.

21. The system of claim 20 wherein the pre-selected frequency bands correspond to at least one Bark band.

22. The system of claim 19 wherein a representative copy of each song is stored in an individual computer file on a computer readable medium.

23. The system of claim 15 wherein at least one media stream is an audio-video television broadcast stream.

24. The system of claim 15 wherein computing parametric information for at least one portion of each media stream comprises computing information from the media stream for characterizing the at least one portion of the media stream.

25. The system of claim 15 wherein analyzing the parametric information to determine whether the parametric information corresponds to a class of sought media objects comprises comparing the parametric information to a predetermined set of characteristic information that corresponds to the class of sought media objects.

26. The system of claim 15 wherein comparing at least two potentially matching possible objects to determine whether any possible objects represent repeat instances of the media object further comprises directly comparing portions of the media stream centered on a location of each potentially matching possible object to determine whether any of the portions represent a repeat instance of a media object.

27. The system of claim 15 wherein comparing at least two potentially matching possible objects to determine whether any possible objects represent repeat instances of the media object further comprises:

computing characteristic information from portions of the media stream centered on a location of each potentially matching possible object; and comparing the characteristic information for each potentially matching possible object to determine whether any of the portions represent a repeat instance of a media object.

28. A computer-implemented process for locating media objects in a media stream and determining temporal endpoints for each media object, comprising using a computing device to:

compute characteristic information for at least one segment of a media stream;

analyze the characteristic information to determine whether a media object is possibly present within any segment of the media stream;

storing the location and characteristic information of any segment of the media stream in an object database when the analysis of the characteristic information indicates that at least part of a media object is possibly present within that segment of the media stream;

querying the object database to locate potentially matching segments of the media stream;

comparing potentially matching segments of the media stream to identify repeating segments within the media stream; and automatically aligning and comparing portions of the media stream centered on each repeating segment of the media stream to determine temporal endpoints for each media object in the media stream, wherein the temporal endpoints for each media object represent start and end points of each media object.

29. The computer-implemented process of claim 28 wherein automatically aligning and comparing portions of the media stream comprises aligning the portions and tracing backwards and forwards in each of the aligned portions to determine start and end points for which each aligned portion is still approximately equivalent to the other aligned portions.

30. The computer-implemented process of claim 28 wherein the media stream is an audio media stream.

31. The computer-implemented process of claim 28 wherein the media stream is a video media stream.

32. The computer-implemented process of claim 28 wherein the media stream is a combined audio and video media stream.

33. The computer-implemented process of claim 28 wherein the media objects are any of songs, music, advertisements, video clips, station identifiers, speech, images, and image sequences.

34. The computer-implemented process of claim 28 wherein the media stream is captured from a broadcast media stream and stored to a computer readable medium prior to computing characteristic information for at least one segment of the media stream.

35. The computer-implemented process of claim 28 wherein analyzing the characteristic information to determine whether a media object is possibly present within any segment of the media stream comprises:

comparing the characteristic information to a predetermined set of characteristics that correspond to at least one type of media object being sought in the stream; and wherein a media object is determined to be possibly present when the comparison indicates that the characteristic information at least partially matches the predetermined set of characteristics.

36. The computer-implemented process of claim 28 wherein querying the object database to locate potentially matching segments of the media stream comprises comparing the characteristic information for each possible object to previous entries in the object database to locate similar possible objects.

37. The computer-implemented process of claim 28 wherein comparing potentially matching segments of the media stream to identify repeating segments within the media stream comprises:

comparing a portion of the media stream centered on a location of each potentially matching segment to a portion of the media stream centered on a location each possible media object; and wherein potentially matching segments are determined to represent repeating segments within the media stream where the segments are similar to within a predetermined threshold level.

38. A method for determining extents of repeating media objects within a media stream, comprising using a computer to:

select a segment of a media stream for comparison;

compare the selected segment to the media stream to identify segments in the media stream having at least one portion which matches at least one portion of the selected segment of the media stream;

align the selected segment and the matching segments, and compare a portion of the media stream centered on a location of each matching segment to a portion of the media stream centered on a location of the selected segment; and determine extents of media objects represented by the selected segment and the matching segments by using the alignment and comparison of the selected segment and the matching segments to identify endpoints of the media objects at locations where the aligned segments are no longer approximately equivalent.

39. The method of claim 38 further comprising storing the endpoint information for each media object in an object database.

40. The method of claim 38 further comprising using the endpoint information to extract each repeating media object from the media stream.

41. The method of claim 40 further comprising storing each extracted repeating media object on a computer readable medium.

42. The method of claim 38 wherein identifying endpoints of the media objects at locations where the aligned segments are no longer approximately equivalent comprises tracing backwards and forwards in the media stream around positions in the media stream corresponding to each of the selected segment and the matching segments to determine locations within the media stream where each aligned segment begins to diverge.

43. The method of claim 38 wherein selecting a segment of the media stream for comparison comprises selecting sequential segments of the media stream for comparison until an end of the media stream is reached.

44. The method of claim 43 wherein the extents of media objects within the media stream are used to prevent repeated searching of the media objects previously located the stream.

45. The method of claim 38 wherein a database of previously identified repeating objects identified in the media stream is searched to identify a match to the segment of a media stream selected for comparison prior to comparing the selected segment to the media stream, and wherein if a matching media object is identified in the search of the database, the media stream is not searched to identify segments in the media stream having at least one portion which matches at least one portion of the selected segment of the media stream.

46. The method of claim 38 wherein the media stream is an audio media stream.

47. The method of claim 38 wherein the media stream is a video media stream.

48. The method of claim 38 wherein the media stream is a combined audio/video media stream.

49. The method of claim 38 wherein the media objects are any of songs, music, advertisements, video clips, station identifiers, speech, images, and image sequences.

50. The method of claim 38 further comprising capturing the media stream by receiving and storing a broadcast media stream.

51. The method of claim 38 further comprising storing at least one representative copy of each media object on a computer readable medium.

52. A computer-implemented process for determining positions of repeating media objects within at least one media stream, comprising using a computing device:

selecting at least one evaluation segment from the at least one media stream;

searching an object database to determine if the at least one evaluation segment at least partially represents a repeating media object matching any objects in the object database;

in the event that the search of the object database determines that the at least one evaluation segment does not at least partially represent a repeating media object matching any objects in the object database, determining whether the evaluation segment and at least one comparison segment at least partially represent a repeating media object by sequentially comparing the at least one evaluation segment to subsequent comparison segments of the at least one media stream to identify comparison segments of the at least one media stream that at least partially match the at least one evaluation segment;

wherein sequentially comparing the at least one evaluation segment to subsequent comparison segments further comprises comparing a portion of the media stream centered on a location of each comparison segment to a portion of the media stream centered on a location of each evaluation segment; and determining positions of any repeating media object at least partially represented by any segments of the at least one media stream.

53. The computer-implemented process of claim 52 further comprising populating the object database with information describing repeating objects within at least a portion of the at least one media stream prior to searching the object database to determine if the at least one evaluation segment at least partially represents a repeating media object matching any objects in the object database.

54. The computer-implemented process of claim 52 wherein determining positions of repeating media objects comprises determining endpoints of the repeating media objects.

55. The computer-implemented process of claim 52 further comprising aligning duplicate copies of repeating media objects within the at least one media stream.

56. The computer-implemented process of claim 55 further comprising identifying endpoints of the duplicate copies of the repeating media objects by tracing backwards and forwards in the at least one media stream to locate points where the aligned duplicate copies of the repeating media objects diverge.

57. The computer-implemented process of claim 52 further comprising storing the positions for each repeating media object in the object database.

58. The computer-implemented process of claim 52 further comprising extracting each repeating media object from the at least one media stream.

59. The method of claim 58 further comprising storing each extracted repeating media object on a computer readable medium.

60. The computer-implemented process of claim 52 further comprising selecting a next evaluation segment from the at least one media stream when a current evaluation segment is determined to not be a probable media object.

61. The computer-implemented process of claim 52 further comprising selecting a next comparison segment of the at least one media stream for sequential comparison to the at least one evaluation segment when a current comparison segment is determined to not be a probable media object.

62. The computer-implemented process of claim 52 wherein the at least one media stream is an audio/video broadcast stream.

63. The computer-implemented process of claim 62 wherein an audio portion of the at least one media stream is separately processed to determine positions of any repeating audio media objects at least partially represented by any segments of the audio portion of the at least one media stream.

64. The computer-implemented process of claim 63 wherein determining the position of any repeating audio media objects serves to identify positions of corresponding video objects within a corresponding video part of the audio/video broadcast stream.

65. The computer-implemented process of claim 52 wherein the positions of repeating media objects within the media stream are used to prevent any repeated searching of segments of the at least one media stream bounded by those positions.

66. A system for locating repeating media objects within a media stream, comprising:

a device for selecting a portion of the media stream;

a device for sequentially comparing the selected portion to subsequent portions of the media stream to identify portions of the media stream that at least partially match the selected portion; and a device for determining locations within the media stream of repeating media objects represented by the at least partially matching portions of the media stream by comparing a portion of the media stream centered on a location of each partially matching portion of the media stream to a portion of the media stream centered on a location of the selected portion of the media stream to determine the location of each of the repeating media objects.

67. The system of claim 66 further comprising searching an object database prior to the sequential comparison to determine if the selected portion of the media stream at least partially represents a repeating media object matching any objects in the object database.

68. The system of claim 67 wherein the sequential comparison is skipped when the selected portion of the media stream at least partially represents a repeating media object matching any objects in the object database.

69. The system of claim 67 further comprising populating the object database with information describing repeating media objects within at least a portion of the media stream prior to searching the object database.

70. The system of claim 66 wherein the media stream is an audio/video broadcast stream.

71. The system of claim 70 wherein an audio portion of the media stream is separately processed to determine locations within the media stream of audio media objects represented by the at least partially matching portions of the audio portion of the media stream.

72. The system of claim 71 wherein determining locations of any repeating audio media objects serves to identify locations of corresponding video objects within a corresponding video part of the audio/video broadcast stream.

73. The system of claim 66 further comprising storing the locations for each repeating media object in an object database.

74. The system of claim 66 further comprising extracting each repeating media object from the media stream and storing each repeating media object on a computer readable medium.

75. The system of claim 66 further comprising extracting each repeating media object from the media stream and storing a representative copy of each repeating media object on a computer readable medium.

76. The system of claim 66 further comprising skipping the comparison and selecting a next subsequent portion of the media stream for comparison to the selected segment when a current subsequent portion of the media stream is determined not to be a probable repeating media object.

77. The system of claim 66 further comprising skipping the comparison and selecting a next selected portion of the media stream for comparison to the subsequent portions of the media stream when a current selected portion of the media stream is determined not to be a probable repeating media object.

78. A method for extracting repeating media objects from a media stream, comprising using a computer to:

select an evaluation segment of a media stream for comparison;

sequentially compare the selected evaluation segment to subsequent segments of the media stream to determine whether any of the sequential subsequent segments of the media stream have any portions which at least partially match any portion of the selected evaluation segment;

after comparing all subsequent segments in a predetermined length of the media stream, determining endpoints of repeating media objects which are determined to exist within the media stream whenever any of the sequential subsequent segments of the media stream have any portions which at least partially match any portion of the selected evaluation segment; and wherein determining endpoints of repeating media objects further comprises automatically aligning and comparing portions of the media stream centered on the evaluation segment and each partially matching subsequent segment of the media stream to determine the endpoints for each repeating media object.

79. The method of claim 78 further comprising selecting a new evaluation segment each time the end of the predetermined length of the media stream is reached while sequentially comparing the selected evaluation segment to subsequent segments of the media stream.

80. The method of claim 78 further comprising skipping the sequential comparison and selecting a next subsequent segment of the media stream for comparison to the selected evaluation segment when a current subsequent segment of the media stream is determined not to be a probable repeating media object.

81. The method of claim 78 further comprising skipping the sequential comparison and selecting a next evaluation segment of the media stream for comparison to the subsequent segments of the media stream when a current selected evaluation segment of the media stream is determined not to be a probable repeating media object.

82. The method of claim 78 wherein determining endpoints of repeating media objects comprises aligning the repeating media objects to identify locations within the media stream where the aligned segments are no longer approximately equivalent.

83. The method of claim 78 further comprising searching an object database prior to the sequential comparison to determine if the selected evaluation segment of the media stream at least partially represents a repeating media object matching any objects in the object database.

84. The method of claim 83 wherein the sequential comparison is skipped when the selected evaluation segment of the media stream at least partially represents a repeating media object matching any objects in the object database.

85. The method of claim 83 further comprising populating the object database with information describing repeating media objects within the predetermined length of the media stream media stream prior to searching the object database.

86. The method of claim 78 wherein the media stream is an audio media stream.

87. The method of claim 78 wherein the media stream is a video media stream.

88. The method of claim 78 wherein the media stream is a combined audio/video media stream.

89. The method of claim 78 wherein the media objects are any of songs, music, advertisements, video clips, station identifiers, speech, images, and image sequences.

90. The method of claim 78 further comprising capturing the media stream by receiving and storing a broadcast media stream.

91. The method of claim 78 further comprising storing at least one representative copy of each repeating media object on a computer readable medium.

* * * * *